(12) United States Patent
Hatoh et al.

(10) Patent No.: US 6,770,396 B2
(45) Date of Patent: Aug. 3, 2004

(54) POLYMER ELECTROLYTE FUEL CELL

(75) Inventors: Kazuhito Hatoh, Osaka (JP); Hiroki Kusakabe, Sakai (JP); Hideo Ohara, Katano (JP); Susumu Kobayashi, Ikoma (JP); Tatsuto Yamazaki, deceased, late of Moriguchi (JP); by Masayo Sugou, legal representative, Tokyo (JP); Nobuhiro Hase, Mino (JP); Shinsuke Takeguchi, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/238,903

(22) Filed: Sep. 11, 2002

(65) Prior Publication Data

US 2003/0152819 A1 Aug. 14, 2003

(30) Foreign Application Priority Data

Sep. 11, 2001 (JP) .......................... 2001-274606

(51) Int. Cl.[7] .............................. H01M 2/00; H01M 2/14
(52) U.S. Cl. .............................. 429/34; 429/39; 429/38; 429/30
(58) Field of Search ................................ 429/34, 38, 39, 429/37, 36, 35, 33, 30, 32

(56) References Cited

U.S. PATENT DOCUMENTS

| | | | | |
|---|---|---|---|---|
| 6,190,793 | B1 | * 2/2001 | Barton et al. | .......... 429/34 |
| 6,270,917 | B1 | * 8/2001 | Maeda et al. | .......... 429/37 |
| 2002/0182470 | A1 | * 12/2002 | Agizy et al. | .......... 429/34 |

FOREIGN PATENT DOCUMENTS

| | | |
|---|---|---|
| JP | 07-312223 | 11/1995 |
| JP | 10-275626 | 10/1998 |
| JP | 2000-164238 | 6/2000 |
| JP | 2001-236982 | 8/2001 |

* cited by examiner

Primary Examiner—Raymond Alejandro
(74) Attorney, Agent, or Firm—McDermott Will & Emery LLP

(57) ABSTRACT

The invention relates to fuel cell end plates comprising a resin-dominant material, preferably made by injection molding to reduce their cost and weight and increase their corrosion resistance.

10 Claims, 14 Drawing Sheets

F I G. 12
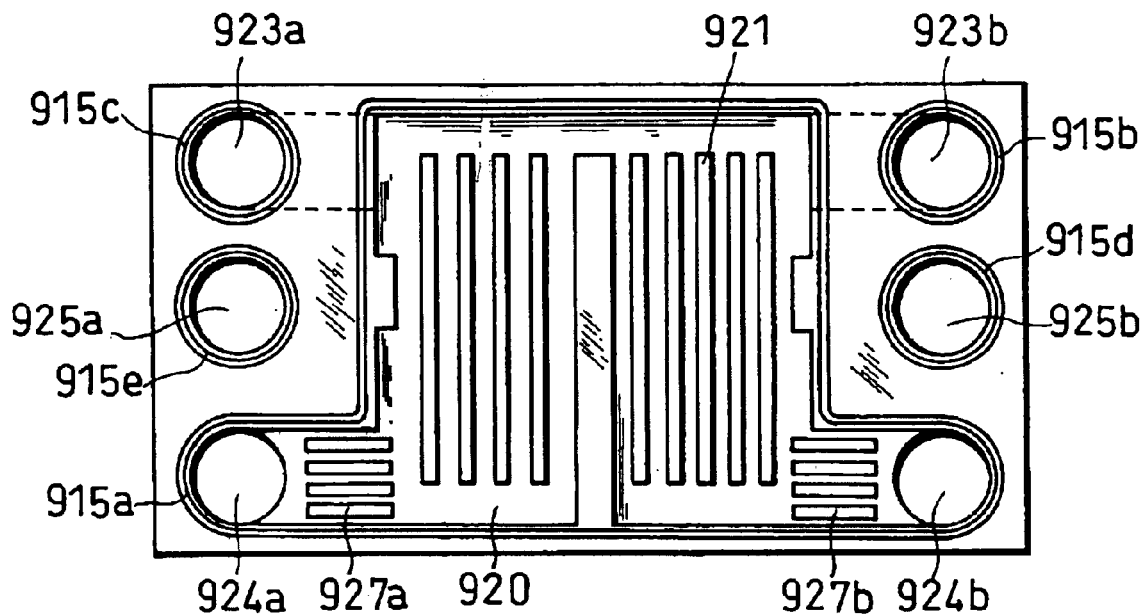
F I G. 13
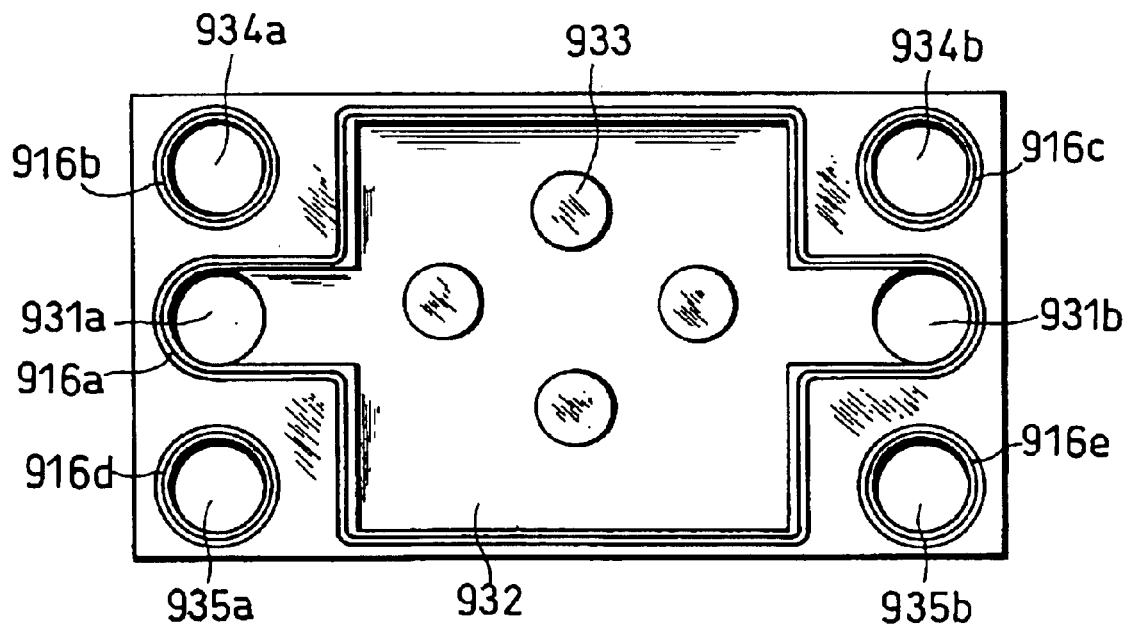

POLYMER ELECTROLYTE FUEL CELL

BACKGROUND OF THE INVENTION

The present invention relates to a polymer electrolyte fuel cell to be used for a portable power source, an electric vehicle, a cogeneration system, and so on.

It is a fundamental principle, on which a polymer electrolyte fuel cell is based, that a fuel gas supplied to the anode side of an electrolyte membrane-electrode assembly (MEA hereafter) electrochemically reacts with an oxidant gas supplied to the cathode side of the MEA through the electrolyte membrane so as to produce water, whereby an electric energy and a thermal energy are simultaneously generated, the electric energy being used depending on uses and needs.

A representative structure of such fuel cell is shown in FIG. 1, wherein a lower half thereof is a front view and an upper half is mainly a cross-sectional view.

Referring to FIG. 1, MEA 10 comprises a polymer electrolyte membrane 11 and two electrodes, i.e. cathode 12 and anode 13, sandwiching the membrane 11. At outer peripheries of the cathode and the anode, gaskets 14 and 15 are respectively arranged so as to prevent the supplied fuel gas and oxidant gas from leaking to outside and from mixing with each other.

A basic unit of a fuel cell, namely unit cell, is such a structure that an MEA is sandwiched by an anode side separator plate having a gas flow channel to supply and exhaust the fuel gas to and from the anode, and by a cathode side separator plate having a gas flow channel to supply and exhaust the oxidant gas to and from the cathode.

A stacked fuel cell is one made by stacking several tens to several hundreds of such unit cells provided with a cooling unit for every 2 to 3 unit cells, which is called cell stack. In FIG. 1, four kinds of separator plates are used, and only four unit cells are schematically shown for simplifying the drawing. A cathode side separator plate 22 placed at the leftmost end of the cell stack 16 has an oxidant gas flow channel 32, while an anode side separator plate 21 placed at the rightmost end of the cell stack 16 has a fuel gas flow channel 31. Each of separator plates 20 placed among MEAs has an oxidant gas flow channel 34 on a surface thereof facing the cathode, and also has a fuel gas flow channel 33 on a surface thereof facing the anode, so that each separator plate 20 functions both as a cathode side separator plate and an anode side separator plate. A cooling unit comprises a composite separator plate made by combining an anode side separator plate 23 and a cathode side separator plate 24. The cathode side separator plate 24 has an oxidant gas flow channel 36 on a surface thereof facing the cathode, and also has a cooling water flow channel 38 on an opposite surface thereof. The anode side separator plate 23 has a fuel gas flow channel 35 on a surface thereof facing the anode, and also has a cooling water flow channel 37 on an opposite surface thereof. By joining the separator plates 23 and 24 in a manner that the cooling water flow channels thereof face each other, one composite cooling water flow channel is formed by the flow channels 37 and 38.

On each of the both ends of the cell stack 16, a current collecting plate 6, an insulating plate and an end plate are stacked in this order. They are tightened by bolts 70 penetrating therethrough and nuts 71, and are supplied with a tightening pressure by use of washers 73.

In this stacked fuel cell, the end plates, the insulating plates, the current collecting plates and the MEAs have common inlet side manifold holes and common outlet side manifold holes. The reactive gases and the cooling water are supplied to the respective separator plates through the inlet side manifold holes, and are exhausted through the outlet side manifold holes. With reference to FIG. 1, an inlet side manifold hole 18a for oxidant gas in the cell stack 16 is shown. FIG. 1 also shows a manifold hole 1a provided at one end plate 4, and an inlet pipe 2a having an end thereof welded to an edge of the manifold hole 1a. The oxidant gas introduced from the pipe 2a flows through the manifold holes provided at the insulating plate, the current collecting plate and the inlet side manifold hole 18a of the cell stack 16, and flows into the oxidant gas flow channels of the respective cathode side separator plates for reaction, wherein an excessive oxidant gas and products produced by the reaction are exhausted out of an oxidant gas outlet pipe 2b provided at the other end plate through outlet side manifold holes. Similarly, the fuel gas is introduced into an introduction pipe 3a welded to one end plate 4, and flows through fuel gas inlet side manifold holes, fuel gas flow channels of the separators and outlet side manifold holes, and is then exhausted out of a fuel gas outlet pipe 3b.

Each current collecting plate 6 is a metal plate for collecting the electric power from the serially stacked cell stack and for connecting the same to the outside. Usually, the current collecting plate is made of stainless steel, cupper, brass or the like, and is often provided with a coating such as plated gold for the purpose of decreasing the contact resistance and increasing the corrosion resistance. Each insulating plate 5 is a resin plate for electrically insulating the end plate 4 and the current collecting plate 6. Each of the end plates 4 is a tightening plate for evenly applying a tightening pressure to the cell stack, and is usually made of a machined stainless steel, wherein pipes for introducing and exhausting the reactive gases and the cooling water are welded to the end plates. Further, for securing sealing among above described elements, they usually have grooves for receiving O-rings at peripheral portions around the manifold holes, whereby the O-rings placed in the grooves function the sealing. In FIG. 1, O-rings 8a, 8b and 28 and those without reference numerals are shown.

According to conventional fuel cells, usually a tightening pressure of about 10.0 to 20.0 kgf/cm$^2$ is used for tightening the cell stack in order to decrease the contact resistance among the electrolyte membranes, electrodes and separators and to secure the gas sealing properties of the gaskets. Therefore, the end plates are generally made of metal materials having high mechanical strengths, wherein the cell stack is tightened by applying a tightening pressure to the end plates at both ends thereof, using a combination of tightening bolts and springs or washers. Further, since the supplied humidified gases and the cooling water touch portions of the end plates, usually stainless steel materials, which have high corrosion resistances, are selected from among metal materials and used for the end plates in order to avoid corrosions by such gases and water. The current collecting plates are usually made of metal materials having higher electric conductivities than those of carbon materials, and are in some cases subjected to surface treatment for lowering contact resistances. Furthermore, the end plates at the both ends of the cell stack are electrically connected to each other by the tightening bolts, the insulating plates having electrically insulating properties are each inserted between the current collecting plate and the end plate for securing insulation between them.

The separator plates to be used for such polymer electrolyte fuel cell need to have high electric conductivity, high gas tightness to the reactive gases, and high corrosion resistance to the reaction during oxidization and reduction of hydrogen and oxygen, namely high acid resistance. For these reasons, conventional separator plates in some cases are made of carbon plates having high gas-impermeabilities, with gas flow channels being made by cutting the surfaces of the carbon plates, or in other cases are each made by pressing a mixture of a graphite powder and a binder with a pressing mold having a configuration for forming gas flow channels, and by firing the same.

Recently, metal plates such as stainless steel are attempted to be used for the separator plates in place of the conventionally used carbon materials. The separator plates using metal plates are likely to get corroded or dissolved during a long period use, because the metal plates are exposed to acid atmosphere at high temperatures. When the metal plate gets corroded, the electric resistance of the corroded portions increases, so that the cell output decreases. Further, when the metal plate gets dissolved, the dissolved metal ions are diffused to the polymer electrolyte and are trapped by ion exchange sites of the polymer electrolyte, whereby consequently the ionic conductivity of the polymer electrolyte per se decreases. It is an ordinary way, therefore, to plate gold to have some thickness on the surface of the metal plate for the purpose of avoiding above described deterioration of ionic conductivity.

As described above, stainless steel plates are usually used for the end plates from the viewpoint of mechanical strength. However, in such case, a relatively thick stainless steel material of about 15 mm or thicker needs to be used therefor, because relatively high tightening pressure needs to be applied to the cell stack, thereby to cause a heavy weight of the resultant fuel cell.

Further, since a thick stainless steel cannot be processed by inexpensive molding processes such as die casting and sheet metal processing, cutting work is needed for the end plates. For starting the power generation of a fuel cell, it is usually necessary to firstly increase the temperature of the fuel cell to a given cell temperature. However, when metal plates such as stainless steel are used for the end plates, a problem arises in that it takes a longer time to start the power generation, because metal materials have higher thermal capacities than those of e.g. resin materials. Furthermore, metal materials are likely to quickly radiate heat. Therefore, when end plates are made of metal plates, it is necessary to provide sufficient heat insulating materials thereto for preventing heat radiation.

In addition, the end plates need to be provided with supply inlets and exhaustion outlets for gases and cooling water. For such purpose, it is necessary according to conventional way either to weld a tube-shaped stainless steel material is to the end plate, or to provide the end plate with a part receiving means such as a screw hole and fittedly join a piping part to the part receiving means. Furthermore, insulating plates are indispensable for the conventional end plates made of electrically conductive materials. Besides, in order to stack a combination of a current collecting plate, an insulating plate and an end plate which are made of different materials, it is necessary to use sealing materials such as O-rings for sealing the gases and the cooling water.

BRIEF SUMMARY OF THE INVENTION

It is an object of the present invention to provide a polymer electrolyte fuel cell, in which one or more of above described problems have been solved.

More specifically, it is an object of the present invention to provide a polymer electrolyte fuel cell, in which an insulating plate between an end plate and a current collecting plate becomes unnecessary.

It is another object of the present invention to provide a polymer electrolyte fuel cell, in which the fuel cell is inexpensive and light in weight, and/or efficient in the utilization of thermal energy, and/or high in the corrosion resistance.

A polymer electrolyte fuel cell according to the present invention comprises: a cell stack comprising plural electrically conductive separator plates and electrolyte membrane-electrode assemblies respectively sandwiched between neighboring ones of the separator plates, each of the electrolyte membrane-electrode assemblies comprising a pair of electrodes and a polymer electrolyte membrane sandwiched between the pair of electrodes; a pair of current collecting plates sandwiching the cell stack; a pair of end plates sandwiching the cell stack provided with the pair of current collecting plates; a tightening means for tightening the pair of end plates so as to apply a tightening pressure to the cell stack; gas supply and exhaustion means for supplying, to the cell stack, and exhausting, from the cell stack, an oxidant gas and a fuel gas, the gas supply and exhaustion means comprising an oxidant gas inlet, an oxidant gas outlet, a fuel gas inlet and a fuel gas outlet, and also comprising an oxidant gas flow channel for connecting the oxidant gas inlet and the oxidant gas outlet and a fuel gas flow channel for connecting the fuel gas inlet and the fuel gas outlet, wherein each of the pair of end plates is made of electrically insulating resin-dominant material comprising resin as a main ingredient. The term "resin-dominant material" used herein means a material having resin as a main ingredient, which may contain a filler or reinforcing material such as glass fiber and ceramic powder in case of need.

According to polymer electrolyte fuel cell of the present invention, the end plates are made of a resin-dominant material in place of a conventional metal material, so that the cost and weight of the fuel cell can be very much reduced, because e.g. conventionally needed insulating plates can be omitted. Further, since the resin-dominant material is slower in its heat radiation than metal materials, so that it is superior in utilizing thermal energy. Further, since it becomes possible to remove, in the fuel cell, portions where the gases and the cooling water contact metal materials, so that the corrosion resistance of the fuel cell can be very much improved.

The end plates are each preferred to comprise an injection-molded body made of the resin-dominant material.

Each of the current collecting plates and each of the end plates are preferred to constitute an integrally molded body, wherein the current collecting plate is fittedly embedded in the end plate.

Each of the gas inlets and the gas outlets is preferred to have a shape of cylinder, and to be structured to protrude from a main surface of each of the end plates.

Alternatively, each of the gas inlets and the gas outlets is preferred to have a shape of cylinder, and to be structured to protrude from an end surface of each of the end plates.

The resin-dominant material of the end plates is preferred to contain a reinforcing material such as glass fiber, and the resin of the resin-dominant material is preferred to be selected from polyphenylene sulfide, liquid crystal polymer and polysulfone.

The tightening pressure by the tightening means is preferred to be from 1.5 to 5.0 $kgf/cm^2$ per unit area.

Each of the end plates is preferred to further have a reinforcing member provided on an outer main surface thereof.

While the novel features of the present invention are set forth particularly in the appended claims, the present invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 12 is a bottom view of the separator plate used for the examples of the present invention, schematically showing the bottom surface thereof.

FIG. 13 is a top plan view of a cooling water flow plate used for the examples of the present invention, schematically showing the top surface thereof.

DETAILED DESCRIPTION OF THE INVENTION

Figure 1:
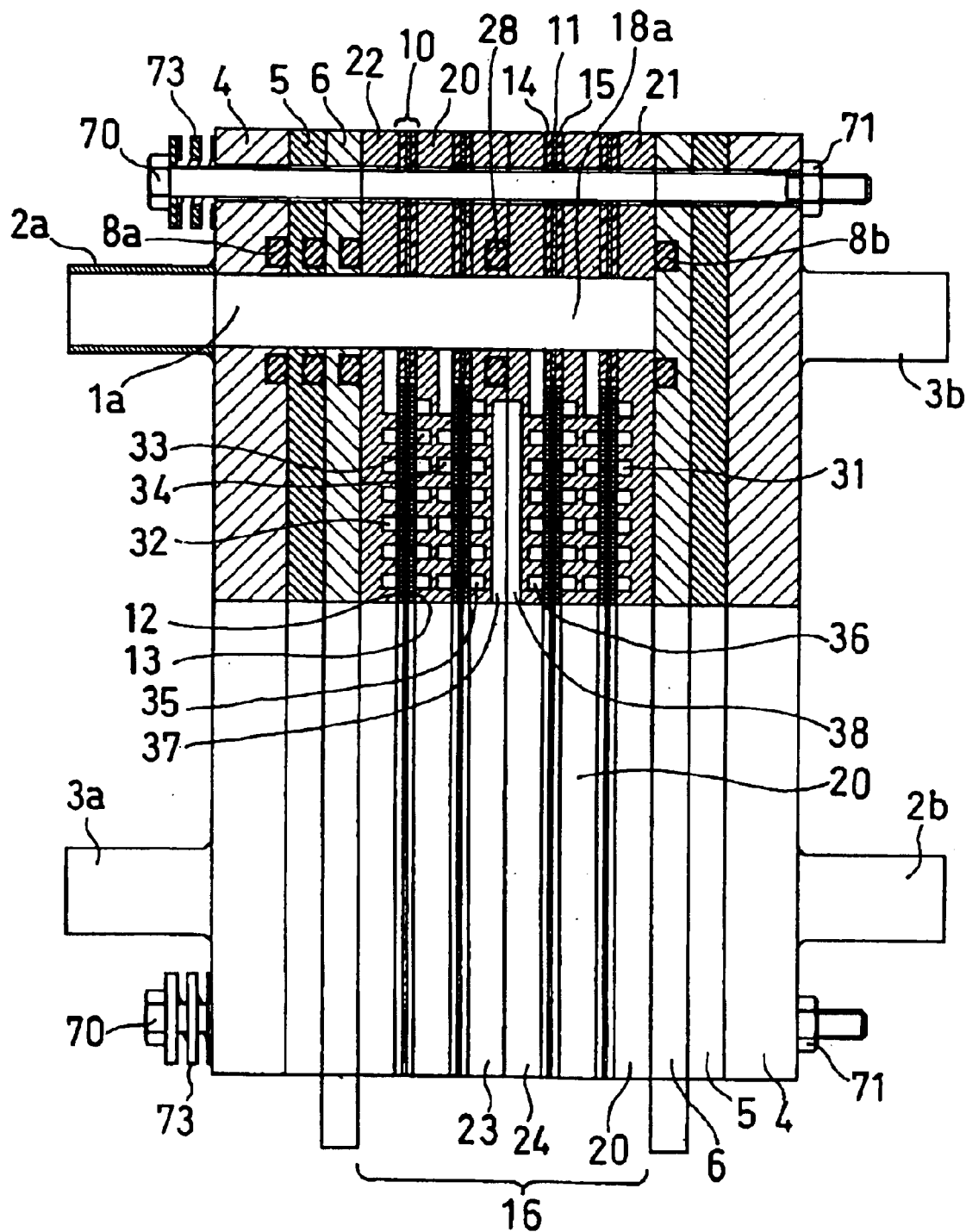
FIG. 1 is a front view, partially in cross-section, of a conventional fuel cell, schematically showing the structure thereof.

A feature of a polymer electrolyte fuel cell according to the present invention is in that end plates thereof are made of a resin-dominant material, namely a material having a resin as a main ingredient. Conventionally a cutting work is necessary for making an end plate, which is made of a metal plate such as stainless steel. In contrast thereto, by using a resin-dominant material for the end plate, the end plate can be formed by e.g. injection molding, and very much cost reduction and light weight thereof can be achieved. The use of a resin for the end plates also allows the thermal capacity of the total fuel cell stack to decrease, thereby to very much reduce the time period necessary for raising the temperature of the fuel cell to a given temperature to start the power generation thereof. Furthermore, the use of a resin for the end plates has been found to be able to suppress heat radiation from the end portions of the fuel cell, whereby the heat generated by the fuel cell can effectively be used without necessitating the use of a heat insulating material.

In order to provide an appropriate inlet or outlet at an end plate, if it is made of a metal material such as stainless steel, it is necessary either to weld a tube-shaped metal material to the end plate, or to provide e.g. a screw hole at the end plate and fittedly join a piping part to the screw hole. In contrast thereto, the use of a resin material for the end plates makes it possible to form such inlets and outlets for the gases and the cooling water integrally with the end plates by e.g. injection-molding the resin. Further, by the use of the resin material for the end plates, it becomes possible to prevent the supplied gases and the cooling water from contacting metal materials such as of conventional end plates and of the inlets and outlets for the gases and the cooling water, whereby the supplied gases and cooling water can be prevented from receiving metal ions to be otherwise mixed therein.

Further, by omitting the insulating plates and insert-molding the current collecting plates in the end plates, sealing materials such as O-rings, which are needed for sealing among the end plates, the insulating plates and the current collecting plates, can be omitted, whereby man-hours for assembly processes can be very much reduced. In the case of insert-molding a current collecting plate in an end plate, the resin material for the end plate is preferred to be so molded that a part thereof extends in a cylindrical shape to cover and fittedly join the inside surfaces of the holes of the current collecting plates, and that cylindrical-shaped resin material portion serves as a manifold hole for the current collecting plate. Thereby, the supplied gases and cooling water can be prevented from contacting the current collecting plate, namely that the current collecting plate can be isolated from the gases and the cooling water. The isolation of the current collecting plates not only prevents metal ions from mixing in the supplied gases and cooling water, which otherwise occur when the gases and cooling water contact metal materials. The isolation of the current collecting plates also have an effect to prevent themselves from suffering serious corrosions, which otherwise occur if the gases, ordinarily humidified, or the cooling water contacts the current collecting plates and if they are electrically conductive, even slightly, because the cell voltage is applied to the current collecting plates.

Hereinafter, examples of structures of fuel cells according to the present invention will be described with reference to FIG. 2 to FIG. 9. Among them, FIGS. 2, 4, 6 and 7 will be described later in more detail, but are also described here briefly. It is to be noted that, among them, FIG. 2 and FIG. 3 as well as FIG. 4 to FIG. 9 are each front view at a lower half thereof and mainly cross-sectional view at an upper half hereof as in FIG. 1, and that the latter six drawings FIG. 4 to FIG. 9 furthermore are each partial view, showing a left portion thereof, for the sake of simpler drawing and description. Moreover, for further simplifying the drawings, obvious elements such as tightening bolts are not wholly shown with respect to e.g. their rod portions penetrating the cell stack.

One of the features common to those examples as shown by the eight drawings FIG. 2 to FIG. 9 is in that O-ring-like gas sealing members (214, 215; 314, 315; 414, 415; 514, 515; 614, 615; 714, 715), each having a circular or ellipsoidal cross-section and being made of a specified material, are bonded to opposing surfaces of neighboring separator plates (222, 220; 322, 320; 422, 420; 522, 520; 622, 620; 722, 720) and the top and rear main surfaces of each polymer electrolyte membrane (211, 311, 411, 511, 611, 711) of each MEA (210, 310, 410, 510, 610, 710) at places close to the periphery of end portion of each electrode and of each manifold hole (201, 301, 401, 501, 601, 701) to encircle the electrodes and the manifold holes, thereby to constitute gaskets (250, 350, 450, 550, 650, 750). Owing to such structure, opposing sealing members, placed at opposing surfaces of neighboring separator plates, sandwich therebetween the polymer electrolyte membrane at certain places, and are indirectly pressed to each other through the polymer electrolyte membrane. At other certain places, opposing sealing members are directly pressed to each other without the polymer electrolyte membrane therebetween. Further, at still other certain places, a sealing member opposes later described auxiliary rib portions provided in a gas communication groove or gas flow channel of a separator plate to which the sealing member opposes, wherein the sealing member and the opposing auxiliary rib portions sandwich therebetween the polymer electrolyte membrane, so that the sealing member is indirectly pressed to the auxiliary rib portions through the polymer electrolyte membrane. The term of "O-ring-like" in the "O-ring-like" sealing member is used herein to express that the sealing member has a ring or loop shape corresponding to the shapes of portions to be encircled and sealed thereby, and that the sealing member has a cross-section of circle or ellipse.

FIG. 11 to FIG. 14 are plan views of separators, more specifically showing how such O-ring-like gas sealing members are arranged at respective places. Referring to those drawings, reference numerals 914a to 914e, 915a to 915e and 916a to 916e are such gas sealing members. Because of the use of such gas sealing members, the tightening pressure necessary to seal the gasket portions can be decreased to its extremity, and most of the tightening pressure can be concentrated onto the electrode portions which are indispensable for decreasing the contact resistances between the electrodes and the electrically conductive separators. It is preferred that the tightening pressure to be applied to the cell stack be decreased in above described manner in order to use a resin material for the end plates.

For reference, according to a conventional manner of forming gaskets, a sheet-form or plate-form gas sealing material is cut to e.g. square rings each having a square frame shape as defined by a larger square and a smaller square, and the square rings are bonded to respective necessary places on the MEAs and the separator plates, wherein each of opposing pairs of sealing members are pressed to each other, either directly or indirectly with a polymer electrolyte membrane therebetween. According to such conventional manner, the contact surface area of each such gas sealing member with the polymer electrolyte membrane or the separator plate becomes so large that a sufficient gas sealing cannot be achieved without a very large tightening pressure to the cell stack.

Figure 2:
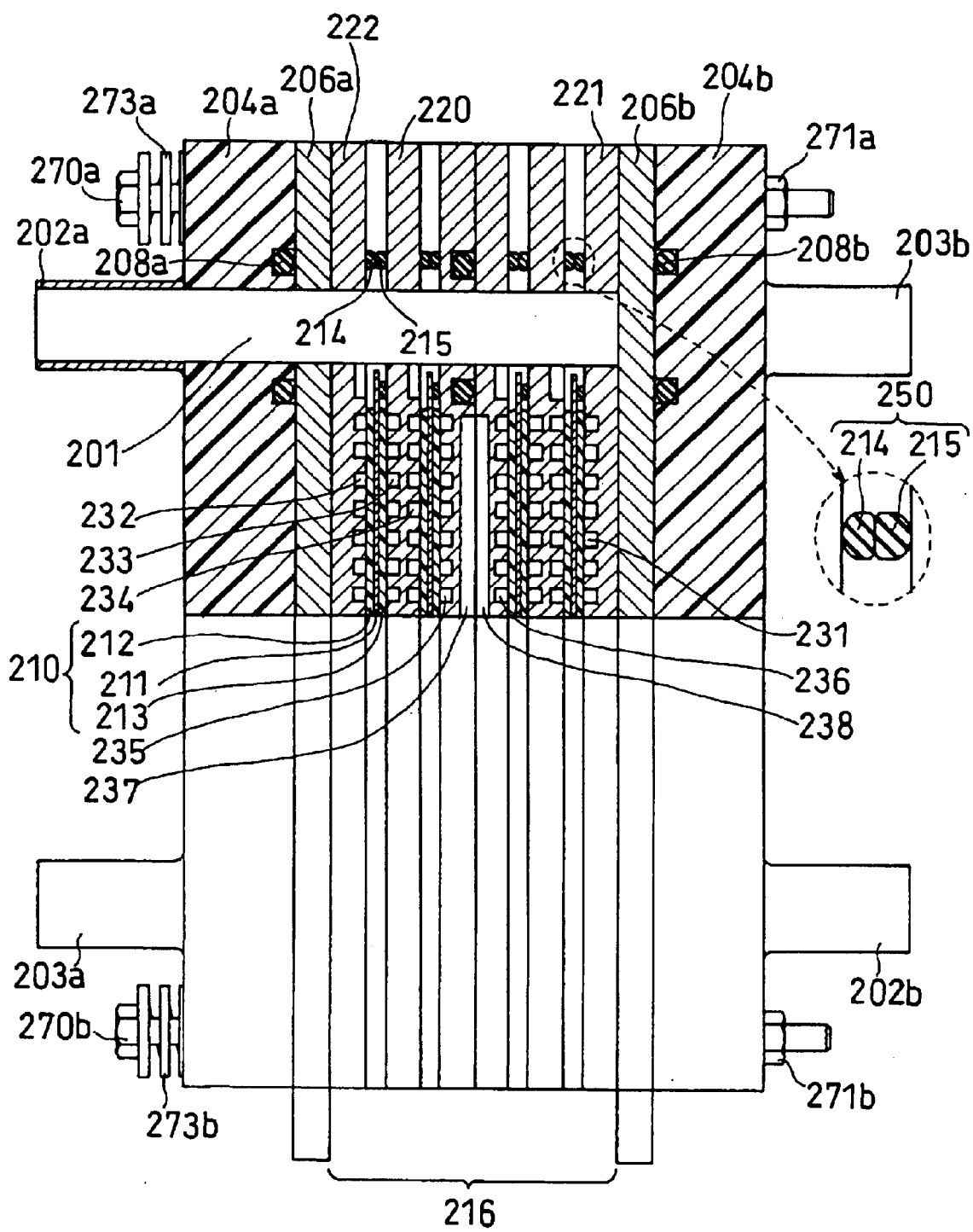
FIG. 2 is a front view, partially in cross-section, of a fuel cell according to an example of the present invention, schematically showing the structure thereof.
Figure 3:
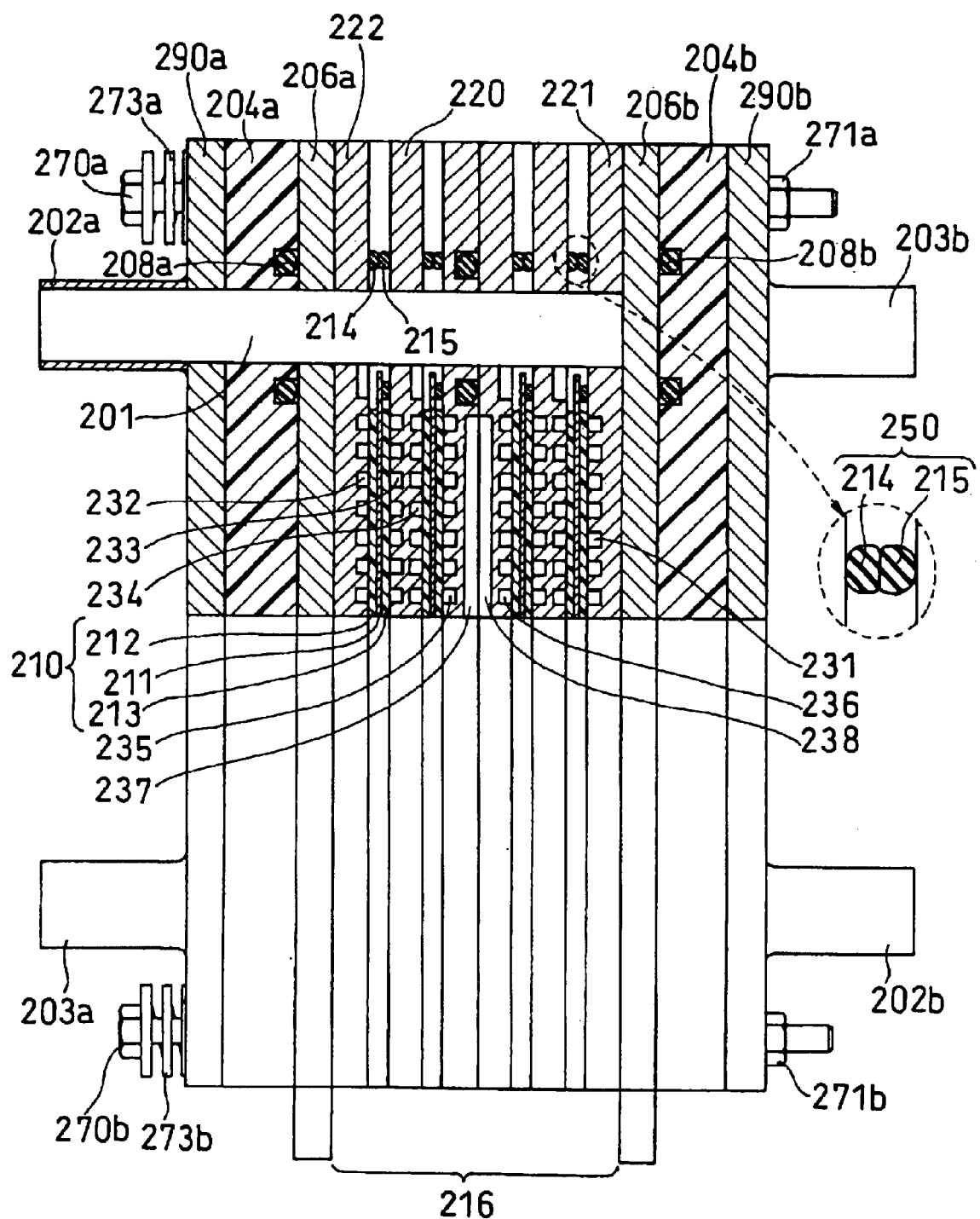
FIG. 3 is a front view, partially in cross-section, of a fuel cell, which has a reinforcing plate added to the fuel cell according to the example of FIG. 2, schematically showing the structure thereof.

Now referring to FIG. 3, the structure of a fuel cell shown therein is basically the same as that shown in FIG. 2, but further has reinforcing bodies or plates 290a, 290b on outer main surfaces of end plates 204a, 204b for reinforcing the end plates.

Figure 4:
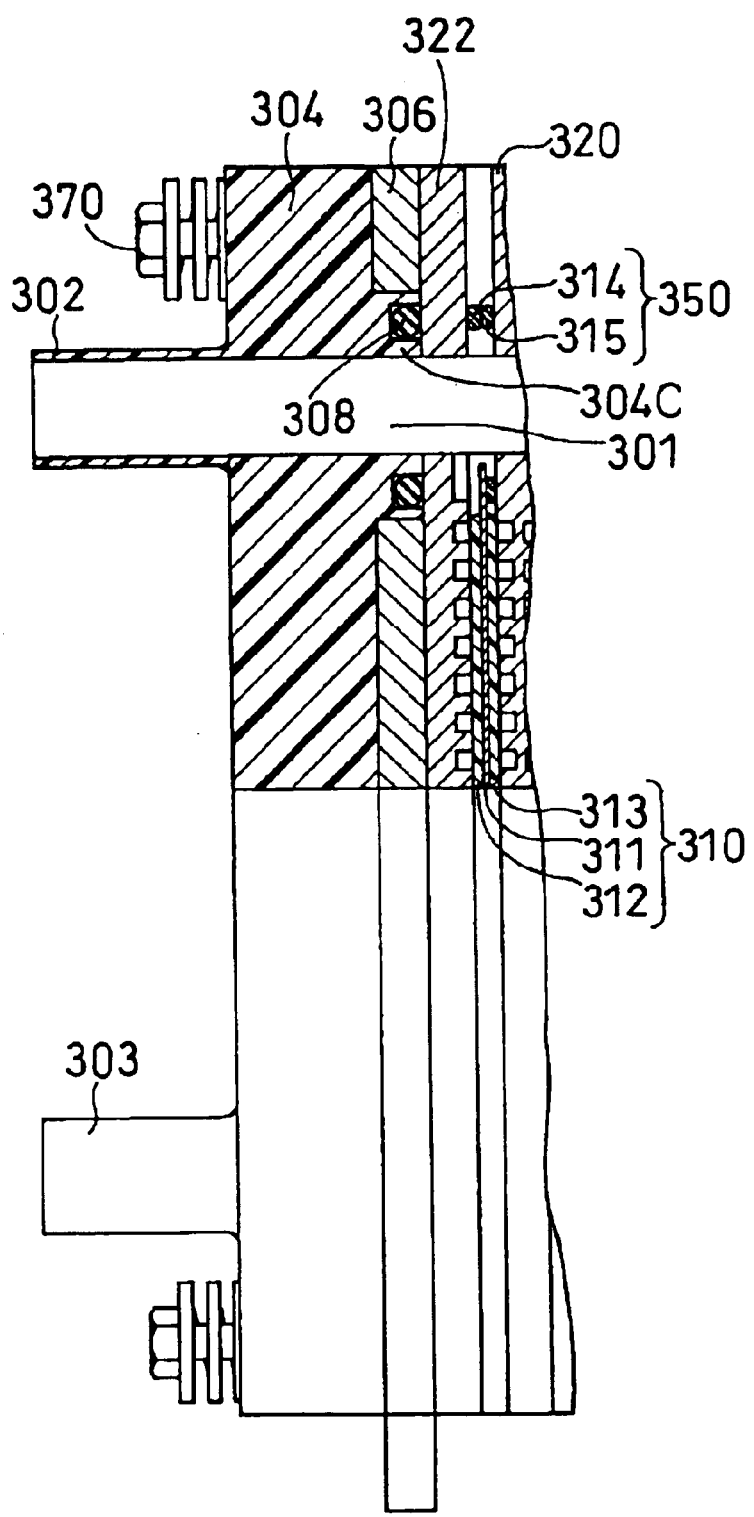
FIG. 4 to FIG. 9 are respectively front views, each partially in cross-section, of parts of fuel cells according to other examples of the present invention, schematically showing the structures thereof.

FIG. 4 shows an example of a fuel cell, wherein a gas inlet 302 (or outlet) is integrally formed with an end plate 304 as part of the end plate 304 by e.g. injection-molding of the end plate material, and the end plate 304 is integrally formed with a current collecting plate 306 firstly inserting the current collecting plate of e.g. brass in a mold, and secondly injection molding a resin dominant material for end plate in the mold, namely by insert-molding the current collecting plate in the end plate. With respect to the structure more specifically, the current collecting plate is inserted in the end plate, and the inside surface of the hole of the current collecting plate, to be a manifold hole, is fittedly joined and covered with a portion 304C of the end plate material having a cylindrical shape, whereby the cylinder-shaped portion 304C of the end plate material serves as a manifold hole 301 for the current collecting plate. The cylinder-shaped portion 304C of the end plate is provided with a groove for an O-ring, and the groove is provided with an O-ring 308 for perfoming gas sealing between the end plate 304 and a separator plate 322 so as to prevent the supplied gases and cooling water from contacting the collecting plate 306.

Figure 5:
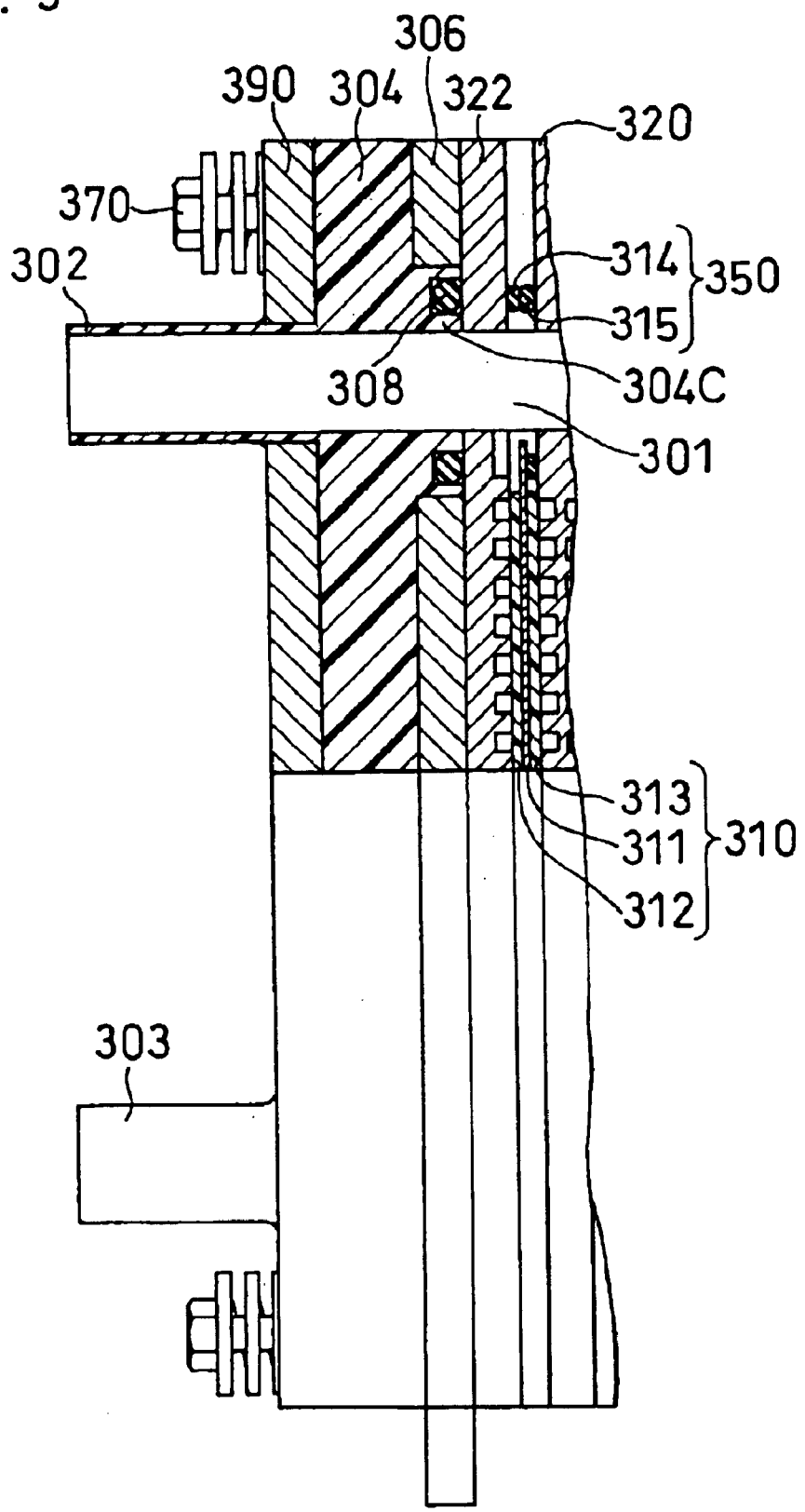

FIG. 5 shows a structure similar to that of FIG. 4, except that a reinforcing body or plate 390 is further provided on an outer main surface of the end plate 304.

Figure 6:
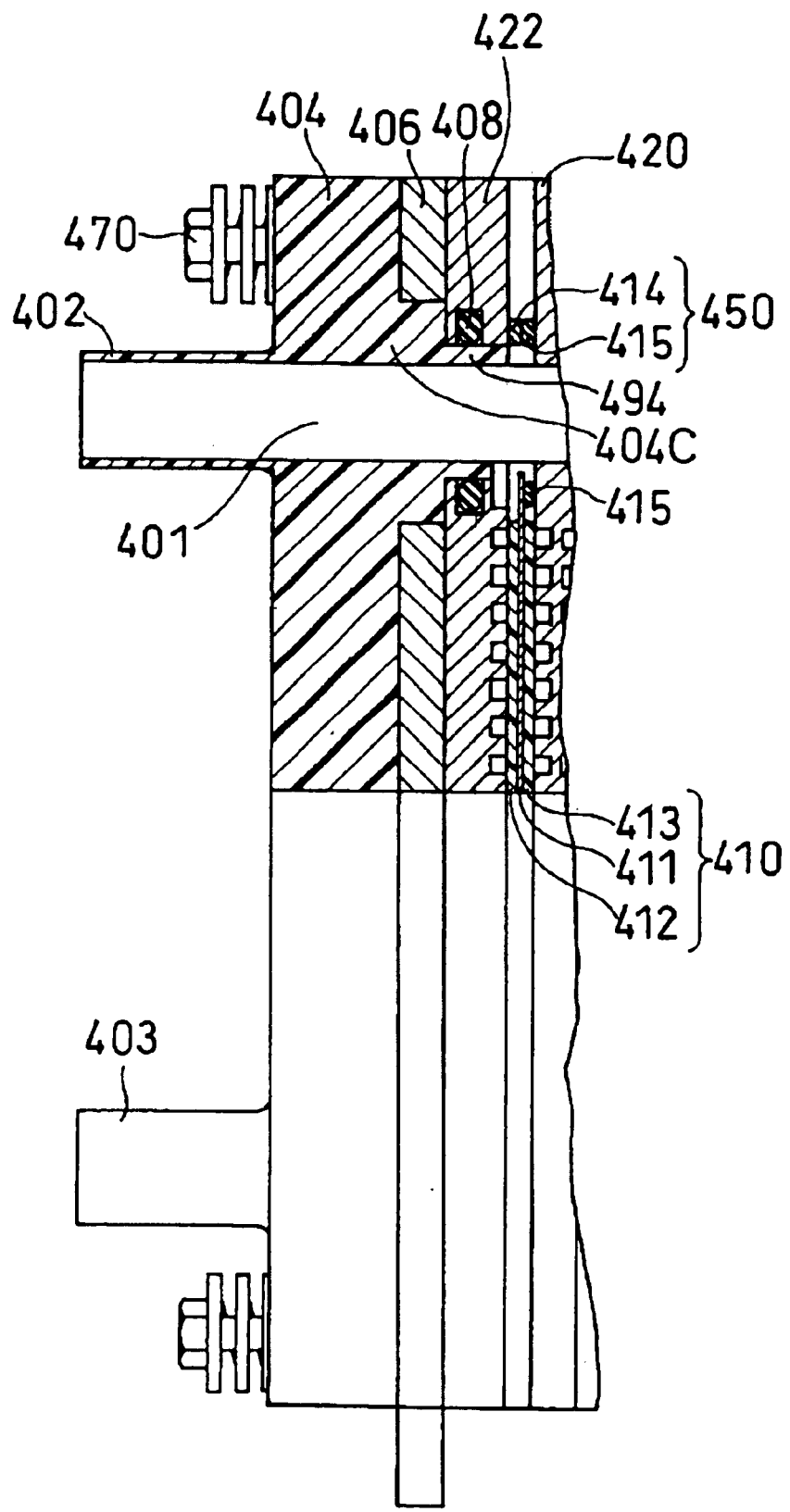

FIG. 6 shows a structure in which a cylinder-shaped portion of the end plate 404 is further extended to form a cylinder-shaped portion 494 to protrude into and fittedly cover the inside surface of a hole of a separator plate 422, so that the cylinder-shaped portion 494 serves as manifold hole for the separator plate 422. The separator plate 422 is provided with a groove for an O-ring at an end thereof contacting the cylinder-shaped portion 494 of the end plate 404, and the groove is provided with an O-ring 408 for performing gas sealing so as to prevent the supplied gases and cooling water from contacting the current collecting plate 406.

Figure 7:
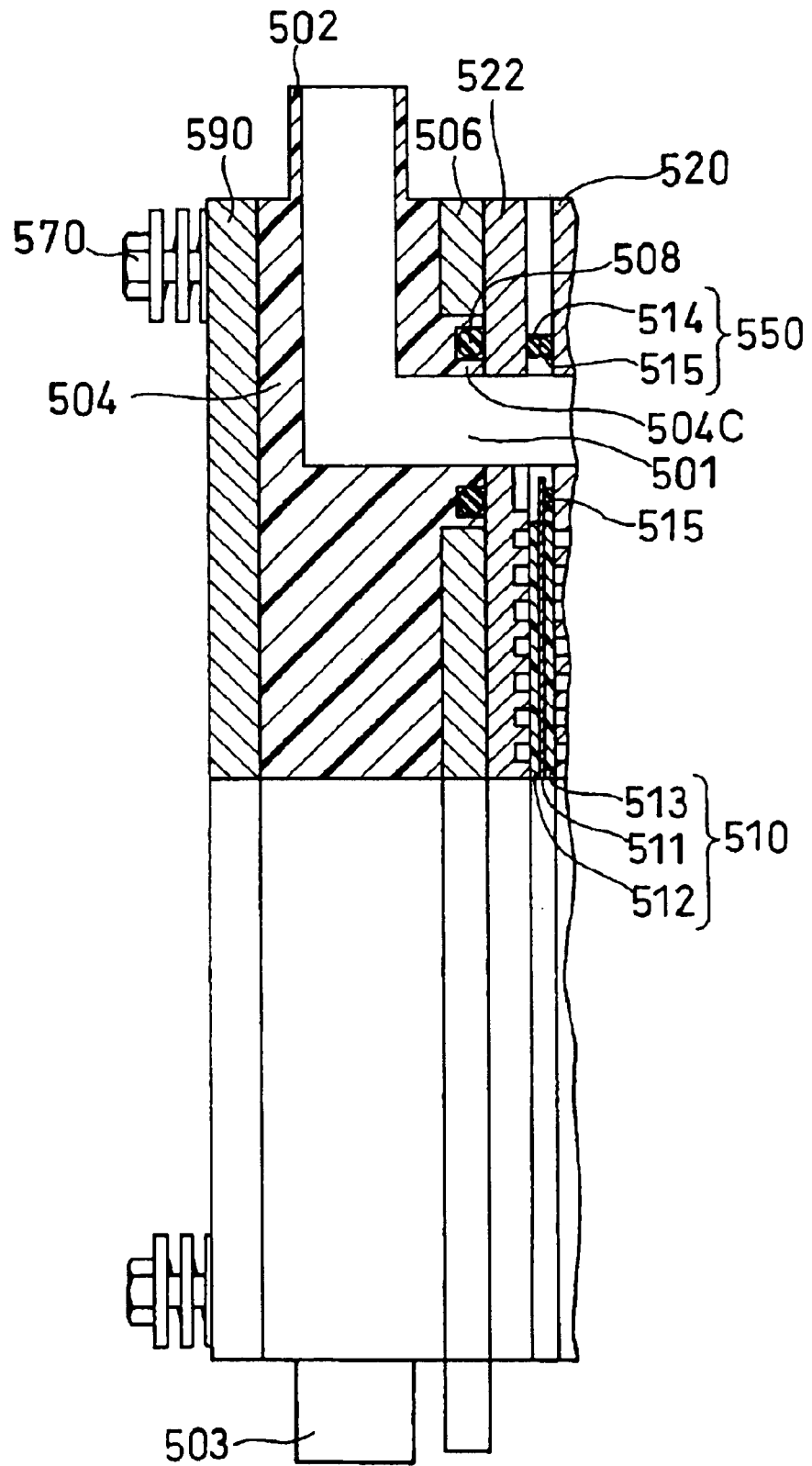

FIG. 7 shows a structure similar to that of FIG. 4, except that a gas inlet 502 (or outlet) is provided at an end surface of an end plate 504, and that a reinforcing body or plate 590 is further provided on an outer main surface of the end plate 504. The structure of FIG. 7 is similar to that of FIG. 4 in e.g. that an MEA 510 is sandwiched by separator plates 522 and 520, that the sealing between the end plate 504 and the separator plate 522 is done by an O-ring 508, and that a current collecting plate 506 is isolated from a manifold hole 501 by a portion 504C of the end plate 504.

Figure 8:
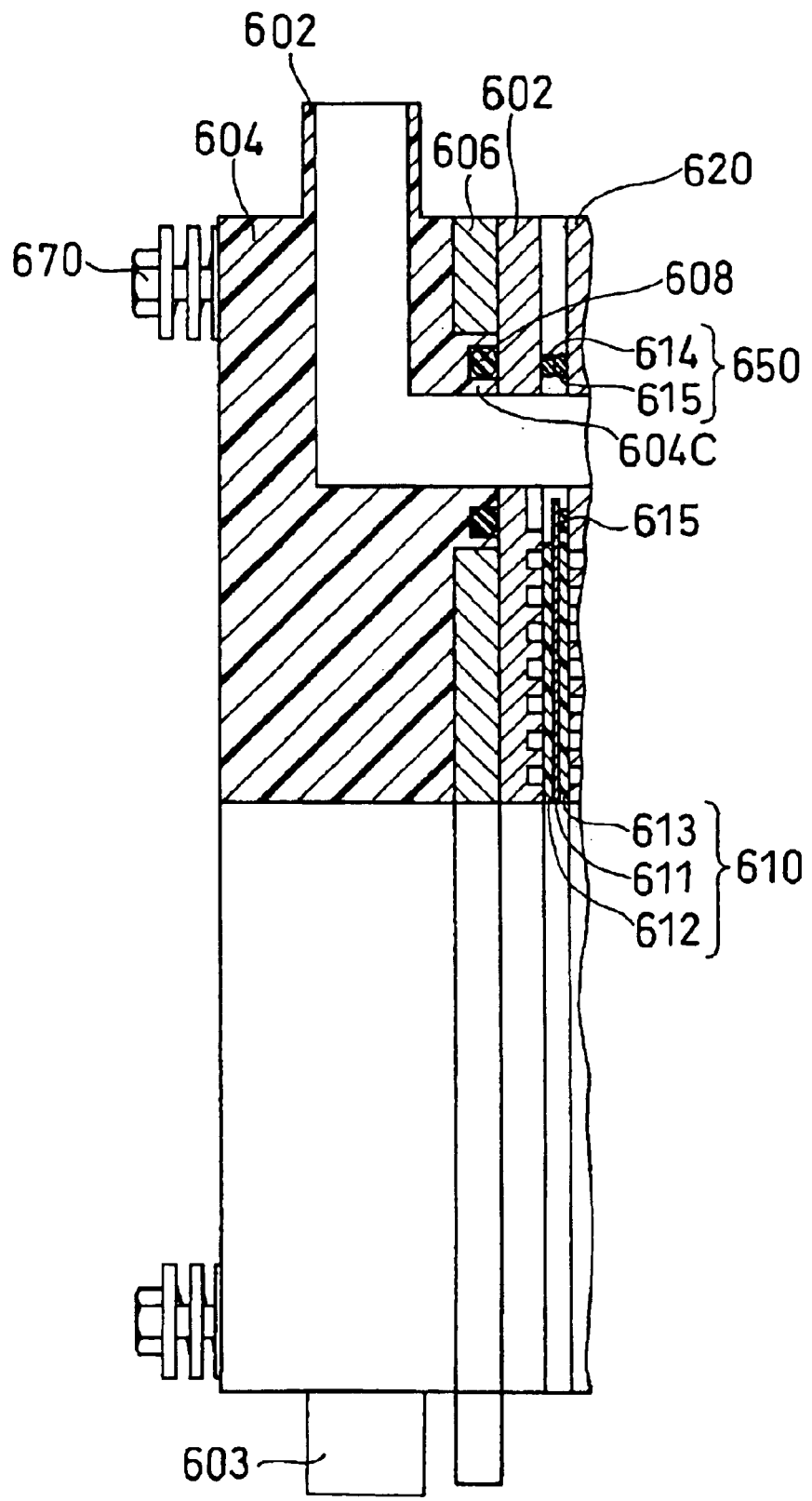

FIG. 8 shows a structure similar to that of FIG. 7, except that here a reinforcing body or plate 590 is omitted.

Figure 9:
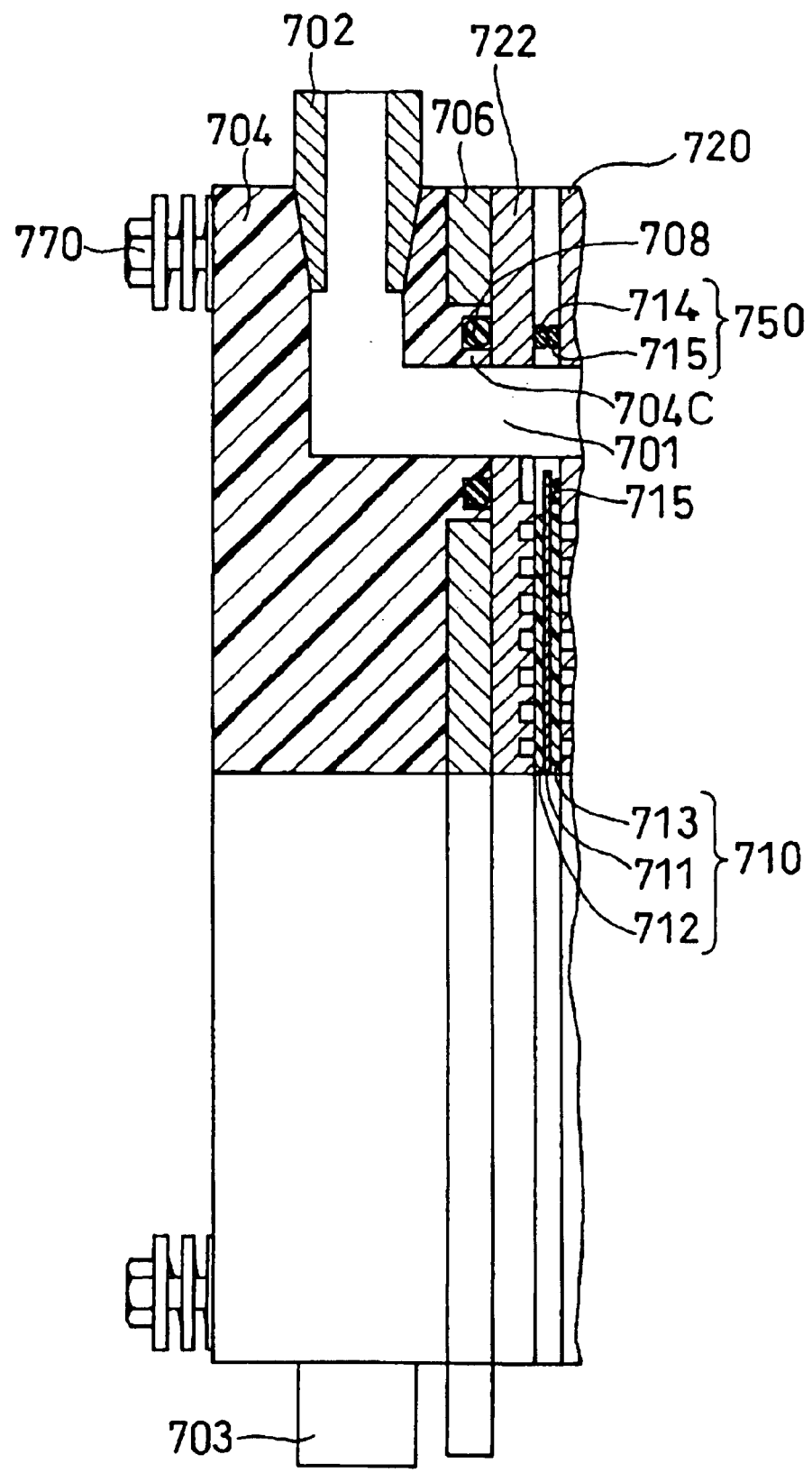

FIG. 9 shows a structure similar to that of FIG. 8, except that here a gas inlet 702 (or outlet) is not integrally formed as a part of an end plate 704 by e.g. injection-molding of the end plate, but that instead a coupling such as Swagelok (product of Swagelok Company), as shown, is fittedly engaged with an end opening or manifold hole of the end plate 704. The structure of FIG. 9 is similar to that of FIG. 8 in e.g. that an MEA 710 is sandwiched by separator plates 722 and 720, that the sealing between the end plate 704 and the separator plate 722 is done by an O-ring 708, and that a current collecting plate 706 is isolated from a manifold hole 701 by a portion 704C of the end plate 704.

Regarding the resin-dominant materials, they are to be resin materials with or without fillers or reinforcing materials such as glass fiber and ceramics, but they are to be basically of resin materials. Examples of preferable resin materials therefor are polypropylene (PP), nylon resin, polyacetal (POM), polycarbonate (PC), modified polyphenylene ether (modified PPE), polybutylene terephthalate (PBT), polyethylene terephthalate (PET), ultrahigh molecular weight polyethylene (UHPE), polymethylpentene (TPX), syndiotactic polystyrene (SPS), polysulfone (PSF), polyethersulfone (PES), polyphthalamide (PPA), polyphenylene sulfide (PPS), polycyclohexylene dimethylene terephthalate (PCT), polyarylate (PAR), polyetherimide (PEI), polyether ether ketone (PEEK), polyimide (PI), fluorocarbon resin, silicone resin and liquid crystal polymer (LCP).

Among those resins, polysulfone (PSF), polyphenylene sulfide (PPS) and liquid crystal polymer (LCP) are more preferable. With respect to liquid crystal polymers, those having 1-type structures are preferable, such as Sumikasuper (product of Sumitomo Chemical Company, Limited), Zenite (product of DuPont Company), Xydar (product of Nippon Oil Company, Ltd.) and Octa (product of Dainippon Ink And Chemicals, Inc.).

Hereafter, examples having embodied the present invention will be described in detail in the following Examples together with some Comparative Examples for comparison.

EXAMPLE 1

Figure 10:
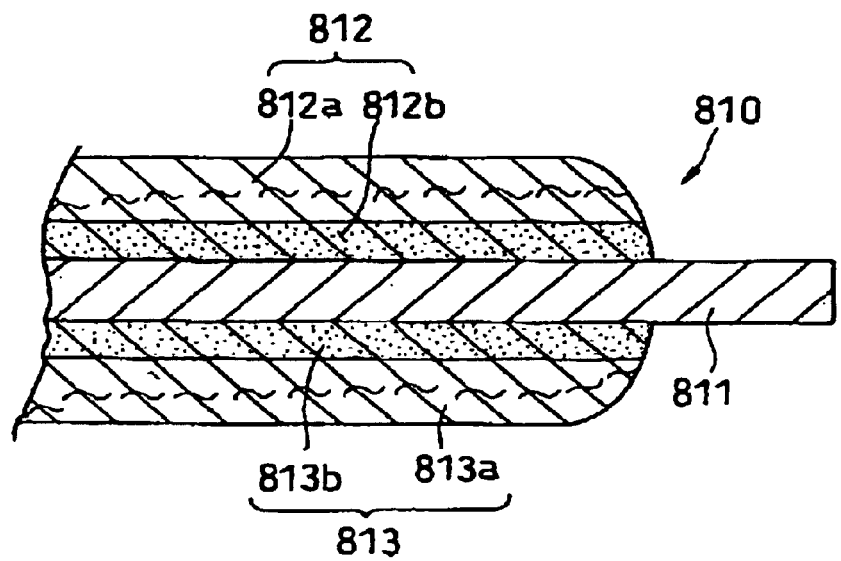
FIG. 10 is a cross-sectional view of an electrolyte membrane-electrode assembly (MEA) used for the examples of the present invention, schematically showing the structure thereof.

First of all, a method of making an electrode having a catalyst layer formed thereon will be described with reference to FIG. 10, which is a cross-sectional view of an electrolyte membrane-electrode assembly (MEA), showing the structure thereof. An acetylene black powder carrying 25 wt % of platinum particles having an average particle size of 30 Å was prepared as a catalyst for electrodes. With a solution of isopropanol having this catalyst powder dispersed therein, an ethyl alcohol dispersion of a perfluorocarbon sulfonic acid powder was mixed, thereby to obtain a catalyst paste.

Meanwhile, a carbon paper to be a supporting body for supporting an electrode was subjected to water repelling treatment. Carbon nonwoven fabrics 812a, 813a (TGP-H-120: product of Toray Industries, Inc.) having an outer dimension of 8 cm×10 cm and a thickness of 360 $\mu$m was immersed in an aqueous dispersion (Neoflon ND1: product of Daikin Industries, Inc.) containing a fluorocarbon resin, and was dried, and then was heated at 400° C. for 30 minutes so as to give the water repellency. On one surface of each of these carbon nonwoven fabrics 812a, 813a, the above catalyst paste was coated by using screen printing, thereby to form catalyst layers 812b, 813b. Here, a part of each catalyst layer 812b, 813b is buried in each carbon nonwoven fabric 812a, 813a. The thus made catalyst layers 812b, 813b and the carbon nonwoven fabrics 812a, 813a integrally were electrodes 812, 813, respectively. Adjustment was made so that each of the thus made reactive electrodes contained 0.5 mg/cm$^2$ of platinum, and 1.2 mg/cm$^2$ of perfluorocarbon sulfonic acid.

Thereafter, a pair of electrodes 812, 813 were bonded, by hot pressing, on a front surface and a rear surface, respectively, of a proton conductive polymer electrolyte membrane 811 having an outer dimension of 10 cm×20 cm in a manner that the catalyst layers 812b, 813b of the electrodes got in contact with the face of the electrolyte membrane 811, thereby to obtain an electrolyte membrane-electrode assembly (MEA) 810. The proton conductive polymer electrolyte membrane used here was made by using a perfluorocarbon sulfonic acid, and was formed to a thin film having a thickness of 50 $\mu$m.

Figure 11:
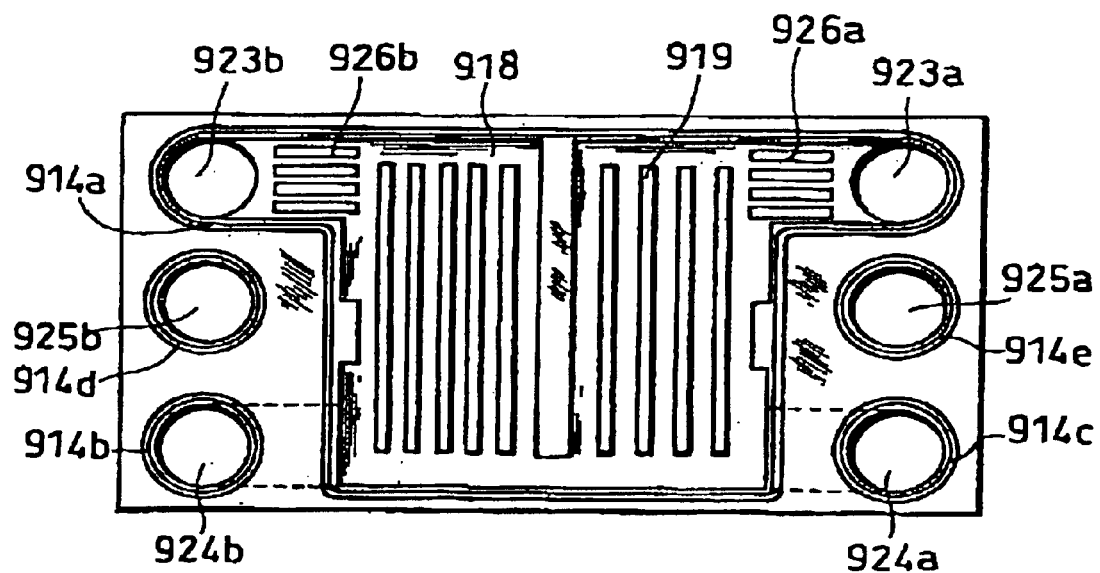
FIG. 11 is a top plan view of a separator plate used for the examples of the present invention, schematically showing the top surface thereof.

Next, an electrically conductive separator plate as shown in FIG. 11 and FIG. 12 was made by cutting a dense and gas-impermeable glassy carbon plate. These FIGS. 11 and 12 are a top plan view and a bottom plan view of the separator plate, showing a top surface and a rear surface thereof. FIG. 11 particularly shows configurations of oxidant gas communication grooves or flow channel, and FIG. 12 particularly shows configurations of fuel gas communication grooves or flow channel. The separator plate has a dimension of 10 cm×20 cm, and a thickness of 4 mm. Grooves 918, 920 are each concave portion having a width of 2 mm and a depth of 1.5 mm, through which the reactive gases communicate respectively. On the other hand, rib portions 919, 921 between the gas flow channels are each convex portion having a width of 1 mm and a height of 1.5 mm. Further, the separator has manifold holes (inlet 923a, outlet 923b) for the oxidant as manifold holes (inlet 924a outlet 924b) for the fuel gas, and manifold holes (inlet 925a, outlet 925b) for the cooling water formed therein. Furthermore, in the gas communication groove or gas flow channel close to the manifold holes, auxiliary rib portions 926a, 926b, 927a, 927b are provided in order that the auxiliary rib portions and position-wise corresponding gas sealing members 915a, 914a, later described, sandwich therebetween the MEA, thereby to perform gas sealing in the vicinity of the manifold holes.

FIG. 13 is a plan view of a separator plate, showing configurations of cooling water flow channel. The same carbon plate used for making the separator plate as shown in FIG. 11 and FIG. 12 was cut at one surface thereof to provide the configurations as shown in FIG. 13, while the opposite surface thereof was cut to provide the configurations as shown in either FIG. 11 or FIG. 12. Referring to FIG. 13, the sizes and the positions of manifold holes (inlet 931a, outlet 931b) for the cooling water were respectively made the same as those of the manifold holes 925a, 925b as shown in FIGS. 11 and 12. Also, the sizes and the positions of manifold holes 934a, 934b, 935a, 935b for gas communications were respectively made the same as those of the manifold holes for the gas communications as shown in FIGS. 11 and 12. Reference numeral 932 designates a cooling water flow channel of a concave portion for the water flown in from the cooling water inlet 931a to flow through, wherein the depth of the concave portion was 1.5 mm. Reference numeral 933 designates island portions having been left when the cooling water flow channel 932 was formed. Therefore, the top surface of each island portion 933 is positioned at the same level as the top surface of the separator plate. The cooling water is flown in from the inlet 931a, and is furcated by the island portions 933 so that it flows the whole area of the flow channel 932, and reaches the outlet 931b.

Next, O-ring-like sealing members made of Viton-GDL (product of DuPont Dow Elastomer Japan) for gaskets, were placed on opposing surfaces of separator plates at places corresponding to a later provided proton conductive polymer electrolyte membrane of MEA in the vicinity of the periphery of the electrodes of the MEA, and at places close to the peripheries of gas communication grooves, and further at places close to the manifold holes in a manner to encircle such later provided electrodes, gas communication grooves and manifold holes. This will be described with reference to the drawings.

Referring to FIG. 11, in order to seal the gas communication groove or gas flow channel 918 and the manifold holes 923a, 923b, 924a, 924b, 925a, 925b for the gases and the cooling water, sealing members 914a to 914e were placed to encircle such gas flow channel and manifold holes. Referring to FIG. 12, in order to seal the gas communication groove or flow channel 920 and the manifold holes 923a, 923b, 924a, 924b, 925a, 925b for the gases and the cooling water, sealing members 915a to 915e were placed to encircle such gas flow channel and manifold holes. Referring to FIG. 13, in order to seal the cooling water flow channel 932 and the manifold holes 934a, 934b, 935a, 935b, 931a, 931b for the gases and the cooling water, sealing members 916a to 916e were placed to encircle such gas flow channel and manifold holes.

Figure 14:
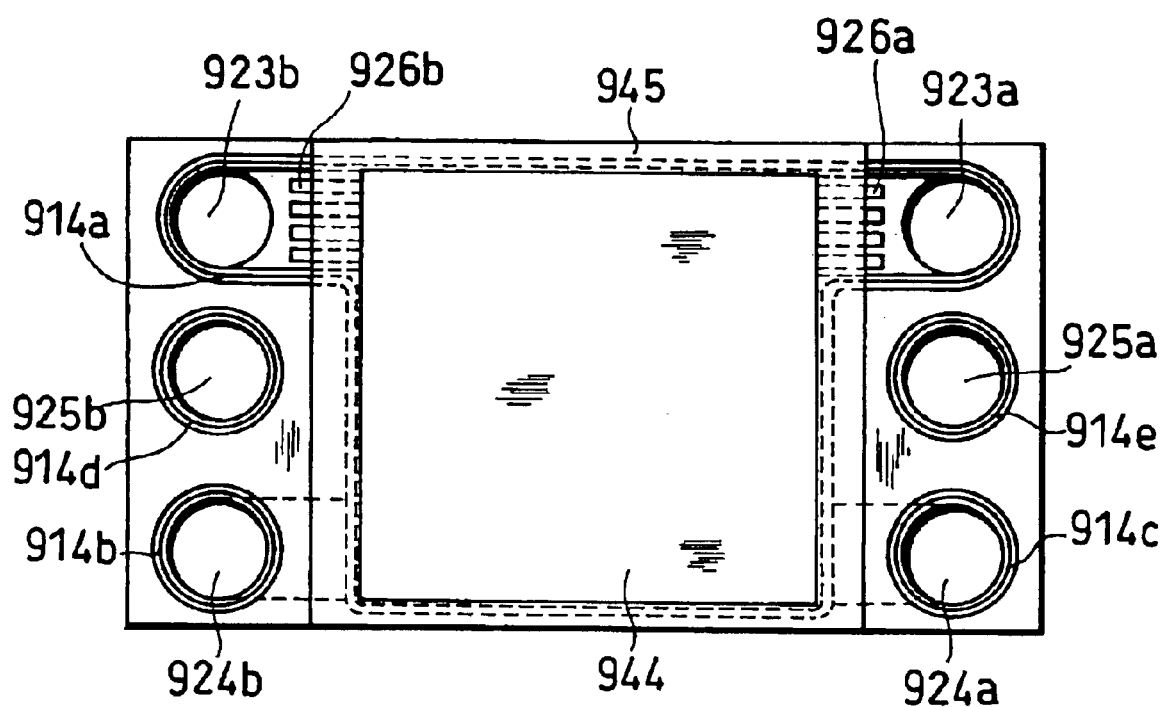
FIG. 14 is a top plan view of an arrangement in which an MEA comprising a polymer electrolyte membrane having electrodes formed thereon is placed on a top surface of a separator plate as shown in FIG. 11, schematically showing a structure thereof.

Next, as shown in FIG. 14, an MEA was placed on a top surface of separator plate as shown in FIG. 11. Referring to FIG. 14, reference numeral 945 designates a proton conductive polymer electrolyte membrane, and 944 designates one of the electrodes provided on the membrane, wherein the other electrode, which is in contact with the separator plate of FIG. 14 or FIG. 11, is not seen, because such other electrode is positioned at a rear side of the shown electrode 944. On the MEA 944, 945 shown in FIG. 14, a further separator plate having a rear surface as shown in FIG. 12 is stacked in such a manner that the rear surface of the further separator plate gets in contact with the MEA 944, 945 placed on the first separator plate shown in FIG. 14 or FIG. 11, whereby a unit cell was made.

By stacking 50 of such unit cells, and by inserting therein, for every two stacked unit cells, a combination of two separator plates for a cooling water unit as shown in FIG. 13, a cell stack for the present EXAMPLE was made. Thereby, necessary group of gaskets were formed by the group of sealing members as described above. That is, for example, a part of the gas sealing members 915b was caused to directly contact with a part of the position-wise corresponding gas sealing member 914a at a position to encircle the manifold hole 923b. The gas sealing member 915d was caused to directly contact with the gas sealing member 914d at a position to encircle the manifold hole 925b. At positions being close to the peripheries of the electrodes and encircling the gas communication grooves or gas flow channels 920, 918, the polymer electrolyte membrane of the MEA, at certain portions thereof, was sandwiched between the gas sealing members 915a, 914a, and was also sandwiched, at certain other portions thereof, between the gas sealing member 915a and the auxiliary rib portions 926b, 926a, and was further sandwiched, at still other certain portions thereof, between the rib portions 927b, 927a and the gas sealing member 914a. Accordingly, when the cell stack was later fixed by tightening rods to receive a tightening pressure, the above described mutually position-wise corresponding sealing members were indirectly pressed to each other with the polymer electrolyte membrane therebetween. Or else, the above described mutually position-wise corresponding sealing member and the auxiliary rib portions were indirectly pressed to each other with the polymer electrolyte membrane therebetween. Or at certain places, the above described mutually position-wise corresponding sealing members were directly pressed to each other. Consequently, such sealing members by themselves at certain places, and such sealing members in combination with the corresponding auxiliary rib portions at other certain places constituted gaskets having sealing function.

On each of the both ends of the cell stack, a current collecting plate made of copper and having a plated gold layer on an outer surface thereof was stacked, and then an end plate having a thickness of 50 mm and being made by injection-molding PPS reinforced with 20 wt % of glass fiber added thereto was stacked on the current collecting plate. Finally, the cell stack with the current collecting plates and the end plates was tightened by tightening rods, thereby to obtain a fuel cell according to the present EXAMPLE.

The structure of the thus made fuel cell according to the present EXAMPLE will be described below with reference to FIG. 2.

Referring to FIG. 2, MEA 210 comprises a polymer electrolyte membrane 211 and two electrodes, i.e. cathode 212 and anode 213, sandwiching the membrane 211. At outer peripheries of the cathode and the anode, gaskets made of gas sealing members 214 and 215 are respectively arranged so as to prevent the supplied fuel gas and oxidant gas from leaking to outside and from mixing with each other. These sealing members 214 and 215 are, as described above, O-ring-like sealing members made of Viton-GDL (product of DuPont Dow Elastomer Japan), each having a circular or ellipsoidal cross-section, which are placed on opposing surfaces of neighboring separator plates, and to the top and rear main surfaces of each polymer electrolyte membrane of each MEA at places close to the periphery of end portion of each electrode and of each manifold hole 201 to encircle the electrodes and the manifold holes, thereby to form gaskets constituted by such sealing members by themselves at certain places, and by such sealing members in combination with the corresponding auxiliary rib portions at certain other places as was already described beforehand. The above described specific sealing member (Viton-GDL) is an elastic body having a good elasticity, and enables sufficient sealing with a minimum tightening pressure.

A cathode side separator plate 222 placed at the leftmost end of the cell stack 216 has an oxidant gas flow channel 232, while an anode side separator plate 221 placed at the rightmost end of the cell stack 216 has a fuel gas flow channel 231. Each of separator plates 220 placed among MEAs has an oxidant gas flow channel 234 on a surface thereof facing the cathode, and also has a fuel gas flow channel 233 on a surface thereof facing the anode, so that each separator plate 220 functions both as a cathode side separator plate and an anode side separator plate. A cooling unit comprises a composite separator plate made by combining an anode side separator plate 223 and a cathode side separator plate 224. The cathode side separator plate 224 has an oxidant gas flow channel 236 on a surface thereof facing the cathode, and also has a cooling water flow channel 238 on an opposite surface thereof. The anode side separator plate 223 has a fuel gas flow channel 235 on a surface thereof facing the anode, and also has a cooling water flow channel 237 on an opposite surface thereof. By joining the separator plates 223 and 224 in a manner that the cooling water flow channels thereof face each other, one composite cooling water flow channel or cooling unit is formed by the flow channels 237 and 238.

Here, it is to be noted that although the fuel cell according to the present invention has a cell stack of 50 stacked unit cell, only four unit cells are schematically shown in FIG. 2, as in FIG. 1, for simplifying the drawing.

On both ends of the cell stack 216, current collecting plates 206a, 206b, and end plates 204a, 204b are respectively stacked in this order. They are tightened by bolts 270a, 270b penetrating therethrough and nuts 271a, 271b, and are supplied with a tightening pressure by use of washers 273a, 273b.

In this stacked fuel cell, the end plates, the current collecting plates, the separator plate and the MEAs have common inlet side manifold holes and common outlet side manifold holes. The reactive gases and the cooling water are supplied to the respective separator plates through the inlet side manifold holes, and are exhausted through the outlet side manifold holes. FIG. 2 shows an inlet side manifold hole 201 for oxidant gas, and also shows an inlet pipe 202a having an end thereof welded to an edge of the manifold hole 201. The oxidant gas introduced from the pipe 202a flows through the manifold holes provided at the current collecting plate and the inlet side manifold hole 201 of the cell stack 216 (the manifold holes being collectively designated by reference numeral 201), and flows into the oxidant gas flow channels of the respective cathode side separator plates for reaction, wherein an excessive oxidant gas and products produced by the reaction are exhausted out of an oxidant gas outlet pipe 202b provided at the other end plate through outlet side manifold holes. Similarly, the fuel gas is introduced into an introduction pipe 203a welded to one end plate 204a, and flows through fuel gas inlet side manifold holes, fuel gas flow channels of the separators and outlet side manifold holes, and is then exhausted out of a fuel gas outlet pipe 203b.

Further, for securing sealing among above described elements, they have grooves for receiving O-rings at peripheral portions around the manifold hole 201, whereby the O-rings placed in the grooves function as the sealing. In FIG. 2, O-rings 208a, 208b and 228 and those without reference numerals are shown.

As evident from the foregoing descriptions, conventionally used insulating plates were not used in the present EXAMPLE. In the present EXAMPLE, the tightening pressure for tightening the cell stack by tightening the both end plates was selected to be 5.0 kgf/cm$^2$. Such a low tightening pressure was realized by the use of above described O-ring-like sealing members as gaskets. Namely, by sealing the gases using the O-ring-like sealing members made of the specific material, the necessary tightening pressure for the sealing could be minimized to its extremity, whereby most of the tightening pressure could be concentrated onto the electrode portions, where the tightening is indispensable for reducing the contact resistances between the electrodes and the electrically conductive separator plates. Thereby, the resultant tightening pressure could be reduced to about half of that needed for a conventional stacked fuel cell, and such minimum tightening pressure was found to be an important factor for realizing the use of end plates made of resin materials.

The thus made polymer electrolyte fuel cell according to the present EXAMPLE was kept at 80° C., wherein a hydrogen gas humidified and heated to have a dew point of 78° C. was supplied to the anode side, and air humidified and heated to have a dew point also of 78° C. was supplied to the cathode side of the fuel cell. As a result thereof, open-circuit voltage of 50 V was obtained under non-load operation, which did not output electric current to outside.

Figure 16:
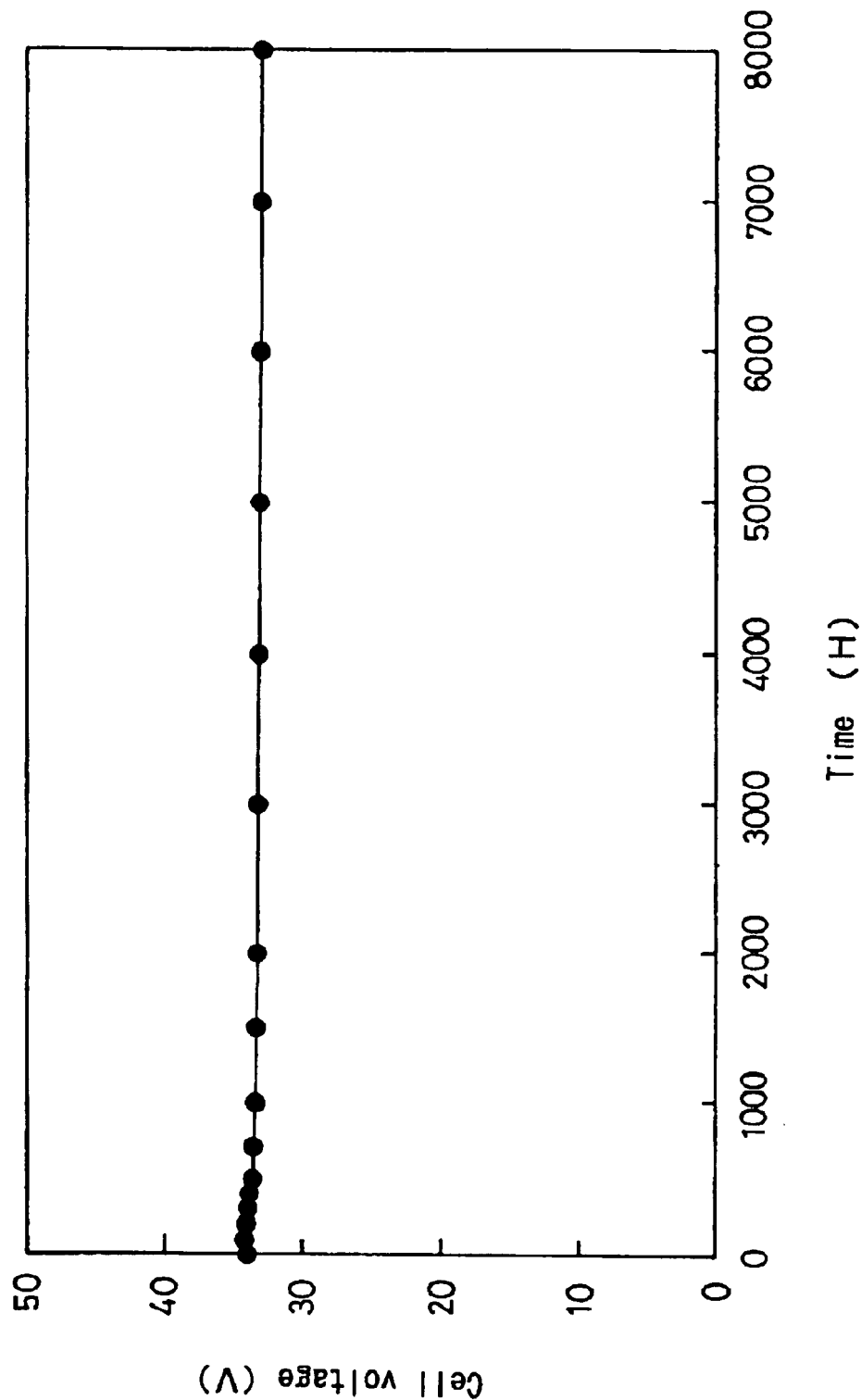
FIG. 16 is a graph showing aging characteristics of a fuel cell according to an example of the present invention, showing the relation between aging time starting from a continuous power generation test and cell voltages of the fuel cell.

This fuel cell was then subjected to a continuous power generation test under the conditions of a fuel utilization rate of 80%, an oxygen utilization rate of 40% and an electric current density of 0.5 A/cm$^2$. Then the variation, with time, of the output voltage of the fuel cell was measured. As a result, it was confirmed that the fuel cell according to the present EXAMPLE maintained a cell output of 1.3 kW (33 V-40 A) or more for a period of 8,000 hours or more. The variation, with time, of the cell voltage as measured, i.e. aging characteristics, is shown in FIG. 16.

EXAMPLE 2

A polymer electrolyte fuel cell according to the present EXAMPLE was made in a manner the same as that described in EXAMPLE 1, except that here the tightening pressure for tightening the both end plates was selected to be 3.0 kgf/cm$^2$ in place of 5.0 kgf/cm$^2$.

The thus made polymer electrolyte fuel cell according to the present EXAMPLE was kept at 80° C., wherein a hydrogen gas humidified and heated to have a dew point of 78° C. was supplied to the anode side, and air humidified and heated to have a dew point also of 78° C. was supplied to the cathode side of the fuel cell. As a result thereof, open-circuit voltage of 50 V was obtained under non-load operation, which did not output electric current to outside.

This fuel cell was then subjected to a continuous power generation test under the conditions of a fuel utilization rate of 80%, an oxygen utilization rate of 40% and an electric current density of 0.5 A/cm$^2$. Then the variation, with time, of the output voltage of the fuel cell was measured. As a result, it was confirmed that the fuel cell according to the present EXAMPLE maintained a cell output of 1.3 kW (33 V-40 A) or more for a period of 8,000 hours or more.

EXAMPLE 3

A polymer electrolyte fuel cell according to the present EXAMPLE was made in a manner the same as that described in EXAMPLE 1, except that here the tightening pressure for tightening the both end plates was selected to be 2.0 kgf/cm$^2$ in place of 5.0 kgf/cm$^2$.

The thus made polymer electrolyte fuel cell according to the present EXAMPLE was kept at 80° C., wherein a hydrogen gas humidified and heated to have a dew point of 78° C. was supplied to the anode side, and air humidified and heated to have a dew point also of 78° C. was supplied to the cathode side of the fuel cell. As a result thereof, open-circuit voltage of 50 V was obtained under non-load operation, which did not output electric current to outside.

This fuel cell was then subjected to a continuous power generation test under the conditions of a fuel utilization rate of 80%, an oxygen utilization rate of 40% and an electric current density of 0.5 A/cm$^2$. Then the variation, with time, of the output voltage of the fuel cell was measured. As a result, it was confirmed that the fuel cell according to the present EXAMPLE maintained a cell output of 1.3 kW (33 V-40 A) or more for a period of 8,000 hours or more.

EXAMPLE 4

A polymer electrolyte fuel cell according to the present EXAMPLE was made in a manner the same as that described in EXAMPLE 1, except that here the tightening pressure for tightening the both end plates was selected to be 1.5 kgf/cm$^2$ in place of 5.0 kgf/cm$^2$.

The thus made polymer electrolyte fuel cell according to the present EXAMPLE was kept at 80° C., wherein a hydrogen gas humidified and heated to have a dew point of 78° C. was supplied to the anode side, and air humidified and heated to have a dew point also of 78° C. was supplied to the cathode side of the fuel cell. As a result thereof, open-circuit voltage of 50 V was obtained under non-load operation, which did not output electric current to outside.

This fuel cell was then subjected to a continuous power generation test under the conditions of a fuel utilization rate of 80%, an oxygen utilization rate of 40% and an electric current density of 0.5 A/cm$^2$. Then the variation, with time, of the output voltage of the fuel cell was measured. As a result, it was confirmed that the fuel cell according to the present EXAMPLE maintained a cell output of 1.3 kW (33 V-40 A) or more for a period of 8,000 hours or more.

COMPARATIVE EXAMPLE 1

A polymer electrolyte fuel cell according to the present COMPARATIVE EXAMPLE was made in a manner the same as that described in EXAMPLE 1, except that here the tightening pressure for tightening the both end plates was selected to be 1.0 kgf/cm$^2$ in place of 5.0 kgf/cm$^2$.

The thus made polymer electrolyte fuel cell according to the present EXAMPLE was kept at 80° C., wherein a hydrogen gas humidified and heated to have a dew point of 78° C. was supplied to the anode side, and air humidified and heated to have a dew point also of 78° C. was supplied to the cathode side of the fuel cell. As a result thereof, open-circuit voltage of 40 V was obtained under non-load operation, which did not output electric current to outside.

However, a power generation test could not be carried out, since it was found that gas leak from the fuel cell to outside already started. This was because the tightening pressure was too low to sufficiently perform gas sealing.

Thus, the tightening pressure was gradually increased to confirm the correlation between the tightening pressure and the gas leak. It was thereby confirmed that the gas leak stopped when the tightening pressure was increased up to 1.5 kgf/cm$^2$.

COMPARATIVE EXAMPLE 2

A polymer electrolyte fuel cell according to the present EXAMPLE was made in a manner the same as that described in EXAMPLE 1, except that here the tightening pressure for tightening the both end plates was selected to be 6.0 kgf/cm$^2$ in place of 5.0 kgf/cm$^2$.

The thus made polymer electrolyte fuel cell according to the present EXAMPLE was kept at 80° C., wherein a hydrogen gas humidified and heated to have a dew point of 78° C. was supplied to the anode side, and air humidified and heated to have a dew point also of 78° C. was supplied to the cathode side of the fuel cell. As a result thereof, open-circuit voltage of 50 V was obtained under non-load operation, which did not output electric current to outside.

This fuel cell was then subjected to a continuous power generation test under the conditions of a fuel utilization rate of 80%, an oxygen utilization rate of 40% and an electric current density of 0.5 A/cm$^2$. Then the variation, with time, of the output voltage of the fuel cell was measured. As a result, it was confirmed that the fuel cell according to the present EXAMPLE initially had a cell output of 1.3 kW (33 V-40 A), but that the cell voltage started abruptly decreasing at 2,000 hours after the start of the continuous power generation test. At 2,500 hours, the power generation test could not be continued any longer. Causes therefor were studied, and it was found that gas leak from the fuel cell to outside started, since the end plates made of PPS resin started creeping and bending after such long period operation, because of the too high tightening pressure.

COMPARATIVE EXAMPLE 3

A polymer electrolyte fuel cell according to the present EXAMPLE was made in a manner the same as that described in EXAMPLE 1, except that here end plates each made of SUS 316 (stainless steel) having a thickness of 30 mm and formed by cutting work were used in place of the end plates used in EXAMPLE 1, and that the tightening pressure for tightening the both end plates was selected to be 10.0 kgf/cm$^2$ in place of 5.0 kgf/cm$^2$.

The thus made polymer electrolyte fuel cell according to the present EXAMPLE was kept at 80° C., wherein a hydrogen gas humidified and heated to have a dew point of 78° C. was supplied to the anode side, and air humidified and heated to have a dew point also of 78° C. was supplied to the cathode side of the fuel cell. As a result thereof, open-circuit voltage of 50 V was obtained under non-load operation, which did not output electric current to outside.

This fuel cell was then subjected to a continuous power generation test under the conditions of a fuel utilization rate of 80%, an oxygen utilization rate of 40% and an electric current density of 0.5 A/cm$^2$. Then the variation, with time, of the output voltage of the fuel cell was measured. As a result, it was confirmed that the fuel cell according to the present EXAMPLE maintained a cell output of 1.3 kW (33 V-40 A) or more for a period of 8,000 hours or more. In the case when the SUS plates were used for the end plates, it was confirmed that such a high tightening pressure as of 10.0 kgf/cm$^2$ did not cause any problem, except that the total weight of the fuel cell was too high because of the 30 mm thick SUS plates.

In the EXAMPLES 1 to 4 as described above, no reinforcing bodies or plates were used. So, effects of addition of such reinforcing bodies or plates were studied here. This will be described in the following with reference to FIG. 3. That is, four polymer electrolyte fuel cells for this study were respectively made in a manner the same as those described in EXAMPLES 1 to 4 with reference to FIG. 2, except that here the thickness of each of the end plates used in the EXAMPLES 1 to 4, i.e. 50 mm, was changed to 30 mm, and reinforcing plates 290a, 290b were stacked on the outer main surfaces of the respective end plates. The characteristics of the thus made four fuel cells were measured under the same conditions as used for the measurements in EXAMPLES 1 to 4. It was thereby confirmed that similar characteristics could be obtained with those four fuel cells with respect to both the open-circuit voltages under non-load operation and the variations, with time, of the output voltages thereof.

EXAMPLE 5

A polymer electrolyte fuel cell according to the present EXAMPLE was made in a manner the same as that described in EXAMPLE 2, except that here the end plates were made by injection-molding a liquid crystal polymer (LCP) reinforced with 15 wt % of glass fiber added thereto in place of PPS reinforced with 20 wt % of glass fiber added thereto. The LCP used here was Xydar (product of Nippon Oil Company, Ltd.).

The thus made polymer electrolyte fuel cell according to the present EXAMPLE was kept at 80° C., wherein a hydrogen gas humidified and heated to have a dew point of 78° C. was supplied to the anode side, and air humidified and heated to have a dew point also of 78° C. was supplied to the cathode side of the fuel cell. As a result thereof, open-circuit voltage of 50 V was obtained under non-load operation, which did not output electric current to outside.

This fuel cell was then subjected to a continuous power generation test under the conditions of a fuel utilization rate of 80%, an oxygen utilization rate of 40% and an electric current density of 0.5 A/cm$^2$. Then the variation, with time, of the output voltage of the fuel cell was measured. As a result, it was confirmed that the fuel cell according to the present EXAMPLE maintained a cell output of 1.3 kW (33 V-40 A) or more for a period of 8,000 hours or more.

EXAMPLE 6

A polymer electrolyte fuel cell according to the present EXAMPLE was made in a manner the same as that described in EXAMPLE 2, except that here the end plates were made by injection-molding a liquid crystal polymer (LCP) reinforced with 20 wt % of glass fiber added thereto in place of PPS reinforced with 20 wt % of glass fiber added thereto. The LCP used here was Zenite (product of DuPont Company).

The thus made polymer electrolyte fuel cell according to the present EXAMPLE was kept at 80° C., wherein a hydrogen gas humidified and heated to have a dew point of 78° C. was supplied to the anode side, and air humidified and heated to have a dew point also of 78° C. was supplied to the cathode side of the fuel cell. As a result thereof, open-circuit voltage of 50 V was obtained under non-load operation, which did not output electric current to outside.

This fuel cell was then subjected to a continuous power generation test under the conditions of a fuel utilization rate of 80%, an oxygen utilization rate of 40% and an electric current density of 0.5 A/cm$^2$. Then the variation, with time, of the output voltage of the fuel cell was measured. As a result, it was confirmed that the fuel cell according to the present EXAMPLE maintained a cell output of 1.3 kW (33 V-40 A) or more for a period of 8,000 hours or more.

EXAMPLE 7

A polymer electrolyte fuel cell according to the present EXAMPLE was made in a manner the same as that described in EXAMPLE 2, except that here the end plates were made by injection-molding a liquid crystal polymer (LCP) reinforced with 25 wt % of glass fiber added thereto in place of PPS reinforced with 20 wt % of glass fiber added thereto. The LCP used here was Sumikasuper (product of Sumitomo Chemical Company, Limited).

The thus made polymer electrolyte fuel cell according to the present EXAMPLE was kept at 80° C. wherein a hydrogen gas humidified and heated to have a dew point of 78° C. was supplied to the anode side, and air humidified and heated to have a dew point also of 78° C. was supplied to the cathode side of the fuel cell. As a result thereof, open-circuit voltage of 50 V was obtained under non-load operation, which did not output electric current to outside.

This fuel cell was then subjected to a continuous power generation test under the conditions of a fuel utilization rate of 80%, an oxygen utilization rate of 40% and an electric current density of 0.5 A/cm$^2$. Then the variation, with time, of the output voltage of the fuel cell was measured. As a result, it was confirmed that the fuel cell according to the present EXAMPLE maintained a cell output of 1.3 kW (33 V-40 A) or more for a period of 8,000 hours or more.

EXAMPLE 8

A polymer electrolyte fuel cell according to the present EXAMPLE was made in a manner the same as that described in EXAMPLE 2, except that here the end plates were made by injection-molding a liquid crystal polymer (LCP) reinforced with 30 wt % of glass fiber added thereto in place of PPS reinforced with 20 wt % of glass fiber added thereto. The LCP used here was Octa (product of Dainippon Ink And Chemicals, Inc.).

The thus made polymer electrolyte fuel cell according to the present EXAMPLE was kept at 80° C., wherein a hydrogen gas humidified and heated to have a dew point of 78° C. was supplied to the anode side, and air humidified and heated to have a dew point also of 78° C. was supplied to the cathode side of the fuel cell. As a result thereof, open-circuit voltage of 50 V was obtained under non-load operation, which did not output electric current to outside.

This fuel cell was then subjected to a continuous power generation test under the conditions of a fuel utilization rate of 80%, an oxygen utilization rate of 40% and an electric current density of 0.5 A/cm$^2$. Then the variation, with time, of the output voltage of the fuel cell was measured. As a result, it was confirmed that the fuel cell according to the present EXAMPLE maintained a cell output of 1.3 kW (33 V-40 A) or more for a period of 8,000 hours or more.

EXAMPLE 9

In the present EXAMPLE, electrolyte membrane-electrode assemblies (MEA) and electrically conductive separators were made in the same manner as described in EXAMPLE 1, thereby to obtain a cell stack of 50 stacked cells as in EXAMPLE 1. Here, for making a fuel cell, a composite body of a current collecting plate and an end plate made by inserting the former in the latter was employed in place of the stack of the current collecting plate and the end plate as employed in EXAMPLE 1. More specifically, a current collecting plate made of SUS 304 stainless steel was prepared, and was cleaned at the surface thereof to remove the oxide film thereon, and then was plated with gold on the surface thereof. The thus prepared current collecting plate was inserted in a mold. Into the mold with the current collecting plate inserted therein, a PPS resin with 20 wt % of glass fiber for reinforcement was injection-molded, thereby to obtain the composite body of the current collecting plate and the end plate, which composite body had a thickness of 50 mm.

The structure of such fuel cell with the composite body will be described in the following with reference to FIG. 4 and FIG. 15.

FIG. 4 is a front view, partially in cross-section, of a part of fuel cell according to the present EXAMPLE, schematically showing a feature of the structure thereof. This fuel cell has the same structure as that of the fuel cell according to EXAMPLE 1, except that here the pair of the current collecting plate and the end plate are integrated into a composite body, and that the positions of the O-rings are different from those in EXAMPLE 1. An MEA 310 comprises two electrodes, i.e. cathode 312 and anode 313, and a polymer electrolyte membrane 311 sandwiched by the two electrodes. At outer peripheries of the cathode and the anode, gaskets 350 made of gas sealing members 314 and 315 are respectively arranged so as to prevent the supplied fuel gas and oxidant gas from leaking to outside and from mixing with each other. These sealing members 314 and 315 are, as described above, O-ring-like sealing members made of Viton-GDL (product of DuPont Dow Elastomer Japan), each having a circular or ellipsoidal cross-section, which are placed on opposing surfaces of neighboring separator plates, and to the top and rear main surfaces of each polymer electrolyte membrane of each MEA at places close to the periphery of end portion of each electrode and of each manifold hole 301 to encircle the electrodes and the manifold holes, thereby to obtain gaskets constituted by such sealing members by themselves at certain places, and by such sealing members in combination with the corresponding auxiliary rib portions at certain other places as was already described beforehand. The above described specific sealing member (Viton-GDL) is an elastic body having a good elasticity, and enables sufficient sealing with a minimum tightening pressure.

A combination of separator plates 322, 320 and the MEA 310 sandwiched thereby constitutes one unit cell, and 50 of such unit cells are stacked together with cooling units inserted therein for every two unit cells, each cooling unit being a pair of separator plates for flowing therethrough a cooling water. Thereby, a cell stack as in EXAMPLE 1 was constituted in the present EXAMPLE, although not fully shown in FIG. 4. Also as in EXAMPLE 1, oxidant gas flow channels, fuel gas flow channels and cooling water flow channels were provided in the cell stack of the present EXAMPLE.

On each of both ends of the cell stack, a pair of a current collecting plate and an end plate are provided. However, in FIG. 4, only one pair of a current collecting plate 306 and an end plate 304 are shown. A tightening means 370 penetrating the cell stack and being composed of a bolt, a nut and a washer is provided at each appropriate position of the unit cell for applying a necessary tightening pressure to the cell stack by tightening the both end plates, although FIG. 4 shows only a part of such tightening means and other elements.

One of the features of the present EXAMPLE is in the structure of each end plate nearby a shown O-ring 308. That is, as shown in FIG. 4, the current collecting plate 306 is inserted in the end plate 304, and the inside surface of the hole of the current collecting plate, to be a manifold hole, is fittedly joined and covered with a portion 304C of the end plate material extended to have a cylindrical shape, whereby the cylinder-shaped resin material portion 304C of the end plate material serves as a manifold hole 301 for the current collecting plate 306. Further, the cylinder-shaped portion 304C of the end plate is provided with a groove for an O-ring, and the groove is provided with an O-ring 308 for performing gas sealing between the end plate 304 and the separator plate 322 so as to prevent the supplied gases and cooling water from contacting the current collecting plate 306. Furthermore, gas inlets 302, 303 (or outlets) are integrally formed with the end plate 304 as parts of the end plate 304 by e.g. injection-molding of the end plate material.

In the present EXAMPLE, the tightening pressure by the tightening means was initially selected to be 3.0 kgf/cm$^2$, and then was increased to 5.0 kgf/cm$^2$ for confirming the strength of the end plates. It was confirmed thereby that the end plates here had sufficient strength for the both tightening pressures without having any problems as to the strength thereof.

The thus made polymer electrolyte fuel cell according to the present EXAMPLE was kept at 80° C., wherein a hydrogen gas humidified and heated to have a dew point of 78° C. was supplied to the anode side, and air humidified and heated to have a dew point also of 78° C. was supplied to the cathode side of the fuel cell. As a result thereof, open-circuit voltage of 50 V was obtained under non-load operation, which did not output electric current to outside.

This fuel cell was then subjected to a continuous power generation test under the conditions of a fuel utilization rate of 80%, an oxygen utilization rate of 40% and an electric current density of 0.5 A/cm$^2$. Then the variation, with time, of the output voltage of the fuel cell was measured. As a result, it was confirmed that the fuel cell according to the present EXAMPLE maintained a cell output of 1.3 kW (33 V-40 A) or more for a period of 8,000 hours or more.

After the operation for the period of 8,000 hours, the amount of metal ions in the polymer electrolyte membrane of the MEA was quantified. It was confirmed thereby that quantities of iron, nickel and chromium considered to be attributed to the SUS material of the current collecting plates were respectively lower than detection limits, and thus that the above described structure was effective for corrosion resistances. This is because the resin material of the end plates extended into the inside surface of the hole, to be a manifold hole, of each current collecting plate according to the present EXAMPLE, so that the supplied gases and cooling water could be prevented from directly contacting the metal material of the current collecting plates.

FIG. 5 shows a front view, partially in cross-section, of a part of a fuel cell made by modifying the fuel cell as shown in FIG. 4. According to the fuel cell as shown in FIG. 5, the composite body of each current collecting plate 306 and each end plate 304 had a thickness of 30 mm instead of 50 mm, and a reinforcing plate 390 made of SUS stainless steel and having a thickness of 10 mm was stacked on the outer main surface of each end plate 304. It was confirmed that the thus made fuel cell as shown in FIG. 5 had similar characteristics as those of the fuel cell as shown in FIG. 4, and additionally had a higher resistance to the tightening pressure.

Figure 15:
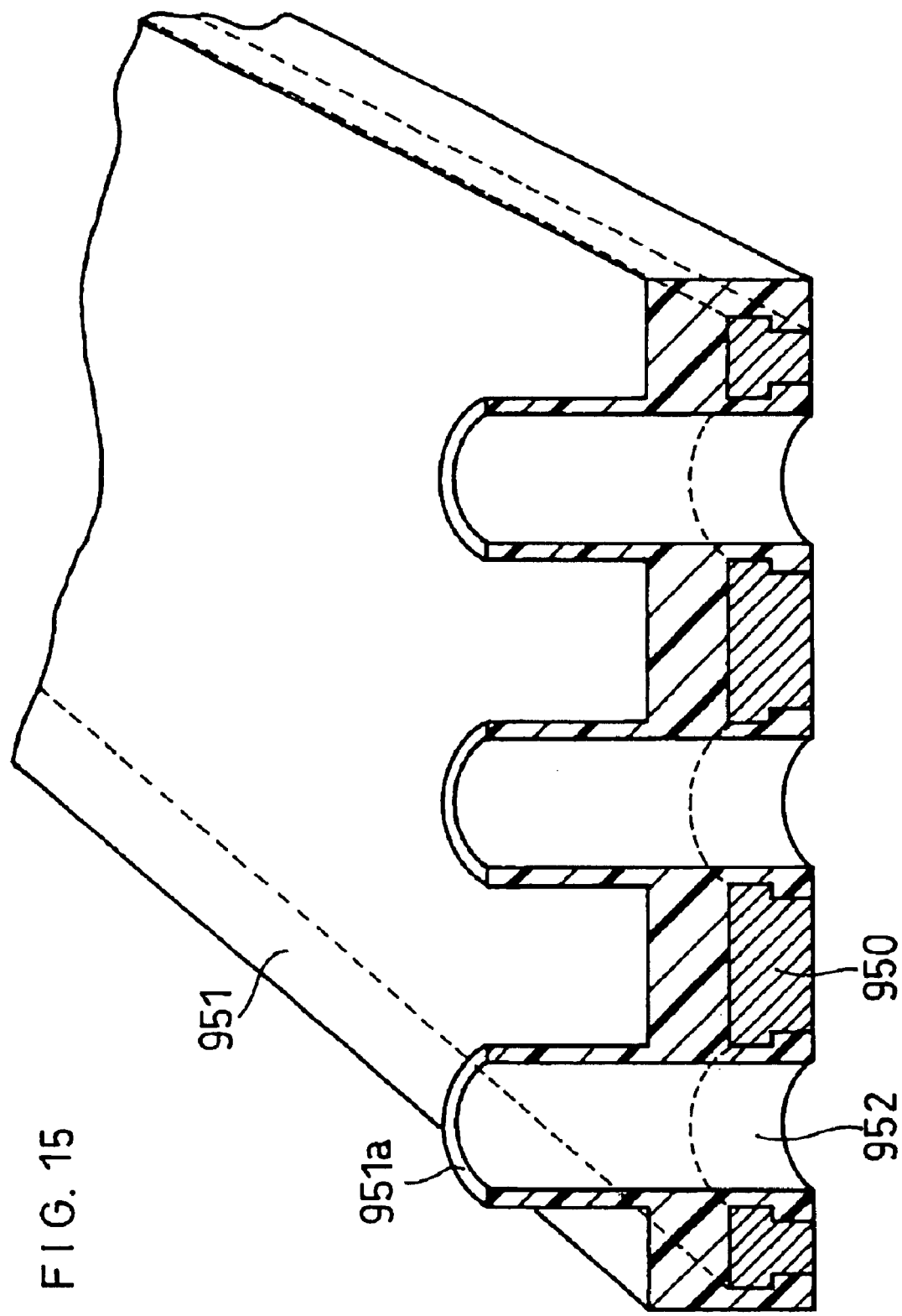
FIG. 15 is a perspective view, partially in cross-section, of an integrally molded body of an end plate and a current collecting plate as shown in an example of the present invention.

FIG. 15 is a perspective view, partially in cross-section, of an integrally molded body of an end plate and a current collecting plate, showing an example modified from the example of such integrally molded body shown in FIG. 4. With reference to FIG. 15, reference numeral 950 designates a current collecting plate inserted in an end plate 951 made of e.g. PPS with a reinforcing glass fiber optionally. Reference numeral 952 designates manifold holes for the gases or the cooling water, and reference numeral 951a designates cylinder-shaped couplings made by injection-molding together with the end plate as inlets or outlets of the gases or the cooling water. Thus, the integral body of the current collecting plate and end plate shown in FIG. 15 has such a structure that the end plate has the current collecting plate inserted therein, and that the cylinder-shaped portions of the end plate isolate the current collecting plate from the gases and the cooling water.

EXAMPLE 10

In the present EXAMPLE, electrolyte membrane-electrode assemblies (MEA) and electrically conductive separators were made in the same manner as described in EXAMPLE 1, thereby to obtain a cell stack of 50 stacked cells as in EXAMPLE 1. Here, for making a fuel cell, a composite body of a current collecting plate and an end plate made by inserting the former in the latter was employed in place of the stack of the current collecting plate and the end plate as employed in EXAMPLE 1. More specifically, a current collecting plate made of brass was prepared, and was inserted in a mold. Into the mold with the current collecting plate inserted therein, a PPS resin with 20 wt % of glass fiber for reinforcement was injection-molded, thereby to obtain the composite body of the current collecting plate and the end plate, which composite body had a thickness of 50 mm.

The structure of such fuel cell will be described in the following with reference to FIG. 6.

FIG. 6 is a front view, partially in cross-section, of a part of fuel cell according to the present EXAMPLE, schematically showing a feature of the structure thereof. This fuel cell has the same structure as that of the fuel cell according to EXAMPLE 1, except that here the pair of the current collecting plate and the end plate are integrated into a composite body, and that the positions of the O-rings are different from those in EXAMPLE 1. A pair of composite bodies, each being of the current collecting plate and the end plate, are respectively provided at the both ends of the cell stack like other examples, but here only one composite body of a current collecting plate 406 and an end plate 404 is shown here like other drawings. A tightening means 470 penetrating the cell stack and being composed of a bolt, a nut and a washer is provided at each appropriate position of the unit cell for applying a necessary tightening pressure to the cell stack by tightening the both end plates, although FIG. 6 shows only a part of such tightening means and other elements. Further, gas inlets 402, 403 (or outlets) are integrally formed with the end plate 404 as parts of the end plate 404 by e.g. injection-molding of the end plate material.

In the present EXAMPLE as well, as shown in FIG. 6, the current collecting plate 406 is inserted in the end plate 404, and the inside surface of the hole, to be a manifold hole, of the current collecting plate is fittedly joined and covered with a portion 404C of the end plate material extended to have a cylindrical shape, whereby the cylinder-shaped resin material portion 404C of the end plate material serves as a manifold hole 401 for the current collecting plate 406.

One of the features of the present EXAMPLE is in the means of gas sealing as described in the following. Referring to FIG. 6, a cylinder-shaped portion 494 made of the end plate material and integral with a cylinder-shaped portion 404C of the end plate 404 is further extended to protrude into and fittedly cover the inside surface of a hole, to be a manifold hole, of a separator plate 422 at a manifold 401 opposite to gas inlet 402 (or outlet) integral with the end plate 404, so that the cylinder-shaped portion 494 serves as manifold hole for the separator plate 422. The separator plate 422 is provided with a groove for an O-ring at an end thereof contacting the cylinder-shaped portion 494 of the end plate 404, and the groove is provided with an O-ring 408 for performing sealing so as to prevent the supplied gases and cooling water from contacting the current collecting plate 406.

Other structures or elements of the fuel cell according to the present EXAMPLE are same as those according to other EXAMPLES as described above. That is, for example, an MEA 410 comprises two electrodes, i.e. cathode 412 and anode 413, and a polymer electrolyte membrane 411 sandwiched by the two electrodes. The MEA is sandwiched between separator plates 422, 420, wherein the combination of separator plates 422, 420 and the MEA 410 constitutes one unit cell, and 50 of such unit cells are stacked together with cooling units inserted therein for every two unit cells, each cooling unit being a pair of separator plates for flowing therethrough a cooling water. At outer peripheries of the cathode and the anode, gaskets 450 made of gas sealing members 414 and 415 are respectively arranged so as to prevent the supplied fuel gas and oxidant gas from leaking to outside and from mixing with each other. These sealing members 414 and 415 are, as described above, O-ring-like sealing members made of Viton-GDL (product of DuPont Dow Elastomer Japan), each having a circular or ellipsoidal cross-section, which are placed on opposing surfaces of neighboring separator plates, and to the top and rear main surfaces of each polymer electrolyte membrane of each MEA at places close to the periphery of end portion of each electrode and of each manifold hole 401 to encircle the electrodes and the manifold holes, thereby to obtain gaskets constituted by such sealing members by themselves at certain places, and by such sealing members in combination with the corresponding auxiliary rib portions at certain other places. The above described specific sealing member (Viton-GDL) is an elastic body having a good elasticity, and enables sufficient sealing with a minimum tightening pressure.

Thereby, a cell stack as in EXAMPLE 1 was constituted in the present EXAMPLE, although not fully shown in FIG. 6. Also as in EXAMPLE 1, oxidant gas flow channels, fuel gas flow channels and cooling water flow channels were provided in the cell stack of the present EXAMPLE.

In the present EXAMPLE, the tightening pressure by the tightening means was initially selected to be 2.0 kgf/cm$^2$, and then was increased to 3.0 kgf/cm$^2$ for confirming the strength of the end plates. It was confirmed thereby that the end plates here had sufficient strength for the both tightening pressures without having any problems as to the strength thereof.

The thus made polymer electrolyte fuel cell according to the present EXAMPLE was kept at 80° C. wherein a hydrogen gas humidified and heated to have a dew point of 78° C. was supplied to the anode side, and air humidified and heated to have a dew point also of 78° C. was supplied to the cathode side of the fuel cell. As a result thereof, open-circuit voltage of 50 V was obtained under non-load operation, which did not output electric current to outside.

This fuel cell was then subjected to a continuous power generation test under the conditions of a fuel utilization rate of 80%, an oxygen utilization rate of 40% and an electric current density of 0.5 A/cm$^2$. Then the variation, with time, of the output voltage of the fuel cell was measured. As a result, it was confirmed that the fuel cell according to the present EXAMPLE maintained a cell output of 1.3 kW (33 V-40 A) or more for a period of 8,000 hours or more.

After the operation for the period of 8,000 hours, the amount of metal ions in the polymer electrolyte membrane of the MEA was quantified. It was confirmed thereby that quantities of cupper and other metals considered to be attributed to the brass of the current collecting plates were respectively lower than detection limits, and thus that the above described structure was effective for corrosion resistances. This is because the resin material of the end plates extended into the inside surface of the hole, to be a manifold hole, of each current collecting plate according to the present EXAMPLE, so that the supplied gases and cooling water could be prevented from directly contacting the metal material of the current collecting plates.

EXAMPLE 11

In the present EXAMPLE, electrolyte membrane-electrode assemblies (MEA) and electrically conductive separators were made in the same manner as described in EXAMPLE 1, thereby to obtain a cell stack of 50 stacked cells as in EXAMPLE 1. Here, for making a fuel cell, a composite body of a current collecting plate and an end plate made by inserting the former in the latter was employed in place of the stack of the current collecting plate and the end plate as employed in EXAMPLE 1. More specifically, a current collecting plate made of brass was prepared, and was inserted in a mold. Into the mold with the current collecting plate inserted therein, a PSF resin with 20 wt % of glass fiber for reinforcement was injection-molded, thereby to obtain the composite body of the current collecting plate and the end plate, which composite body had a thickness of 30 mm. On the outer surface of the end plate, a reinforcing plate having a thickness of 10 mm and made of SUS304 was stacked.

The structure of such fuel cell will be described in the following with reference to FIG. 7.

FIG. 7 is a front view, partially in cross-section, of a part of fuel cell according to the present EXAMPLE, schematically showing a feature of the structure thereof. This fuel cell has the same structure as that of the fuel cell according to EXAMPLE 1, except that here the pair of the current collecting plate and the end plate are integrated into a composite body, that the positions of the O-rings are different from those in EXAMPLE 1, and that the positions of gas inlets (outlets) are different from those as in EXAMPLE 1.

A pair of composite bodies, each being of the current collecting plate and the end plate, are respectively provided at the both ends of the cell stack like other examples, but here only one composite body of a current collecting plate 506 and an end plate 504 is shown here like other drawings. Each of the end plates 504 is further provided with the reinforcing plate 590 on an outer main surface thereof. A tightening means 570 penetrating the cell stack and being composed of a bolt, a nut and a washer is provided at each appropriate position of the unit cell for applying a necessary tightening pressure to the cell stack by tightening the both end plates through the reinforcing plates, although FIG. 7 shows only a part of such tightening means and other elements.

One of the features of the present EXAMPLE is in the position of the gas inlet (or outlet). Referring to FIG. 7, gas inlets 502, 503 (or outlets) are each provided at an end surface of each of the end plates 504, when the gas inlets 502, 503 (or outlets) are integrally formed with the end plate 504 as parts of the end plate 504 by e.g. injection-molding of the end plate material. Such positions of the gas inlets and outlets at the end surfaces of the end plates give advantages to allow the resultant fuel cell to have higher strengths at the outer main surfaces of the end plates, and to increase the degree of freedom in system designing for applying the fuel cells to various uses such as portable powder sources, power sources for electric vehicles and co-generation systems.

As to other structures, in the present EXAMPLE as well, as shown in FIG. 7, each current collecting plate 506 is inserted in each end plate 504 and the inside surface of the hole, to be a manifold hole, of the current collecting plate is fittedly joined and covered with a portion 504C of the end plate material extended to have a cylindrical shape, whereby the cylinder-shaped resin material portion 504O of the end plate material serves as a manifold hole 501 for the current collecting plate 506. The cylinder-shaped portion 504O of the end plate is provided with a groove for an O-ring, and the groove is provided with an O-ring 508 for performing gas sealing between the end plate 504 and the separator plate 522 so as to prevent the supplied gases and cooling water from contacting the current collecting plate 506.

Other structures or elements of the fuel cell according to the present EXAMPLE are same as those according to other EXAMPLES as described above. That is, for example, an MEA 510 comprises two electrodes, i.e. cathode 512 and anode 513, and a polymer electrolyte membrane 511 sandwiched by the two electrodes. The MEA is sandwiched between separator plates 522, 520, wherein the combination of separator plates 522, 520 and the MEA 510 constitutes one unit cell, and 50 of such unit cells are stacked together with cooling units inserted therein for every two unit cells, each cooling unit being a pair of separator plates for flowing therethrough a cooling water. At outer peripheries of the cathode and the anode, gaskets 550 made of gas sealing members 514 and 515 are respectively arranged so as to prevent the supplied fuel gas and oxidant gas from leaking to outside and from mixing with each other. These sealing members 514 and 515 are, as described above, O-ring-like sealing members made of Viton-GDL (product of DuPont Dow Elastomer Japan), each having a circular or ellipsoidal cross-section, which are placed on opposing surfaces of neighboring separator plates, and to the top and rear main surfaces of each polymer electrolyte membrane of each MEA at places close to the periphery of end portion of each electrode and of each manifold hole 501 to encircle the electrodes and the manifold holes, thereby to obtain gaskets constituted by such sealing members by themselves at certain places, and by such sealing members in combination with the corresponding auxiliary rib portions at certain places as was already described beforehand. The above described specific sealing member (Viton-GDL) is an elastic body having a good elasticity, and enables sufficient sealing with a minimum tightening pressure.

Thereby, a cell stack as in EXAMPLE 1 was constituted in the present EXAMPLE, although not fully shown in FIG. 7. Also as in EXAMPLE 1, oxidant gas flow channels, fuel gas flow channels and cooling water flow channels were provided in the cell stack of the present EXAMPLE.

In the present EXAMPLE, the tightening pressure by the tightening means was initially selected to be 3.0 kgf/cm$^2$, and then was increased to 5.0 kgf/cm$^2$ for confirming the strength of the end plates. It was confirmed thereby that the end plates together with the reinforcing plates here had sufficient strength for the both tightening pressures without having any problems as to the strength thereof.

The thus made polymer electrolyte fuel cell according to the present EXAMPLE was kept at 80° C., wherein a hydrogen gas humidified and heated to have a dew point of 78° C. was supplied to the anode side, and air humidified and heated to have a dew point also of 78° C. was supplied to the cathode side of the fuel cell. As a result thereof, open-circuit voltage of 50 V was obtained under non-load operation, which did not output electric current to outside.

This fuel cell was then subjected to a continuous power generation test under the conditions of a fuel utilization rate of 80%, an oxygen utilization rate of 40% and an electric current density of 0.5 A/cm$^2$. Then the variation, with time, of the output voltage of the fuel cell was measured. As a result, it was confirmed that the fuel cell according to the present EXAMPLE maintained a cell output of 1.3 kW (33 V-40 A) or more for a period of 8,000 hours or more.

After the operation for the period of 8,000 hours, the amount of metal ions in the polymer electrolyte membrane of the MEA was quantified. It was confirmed thereby that quantities of copper and other metals considered to be attributed to the brass of the current collecting plates were respectively lower than detection limits, and thus that the above described structure was effective for corrosion resistances. This is because the resin material of the end plates extended into the inside surface of the hole, to be a manifold hole, of each current collecting plate according to the present EXAMPLE, so that the supplied gases and cooling water could be prevented from directly contacting the metal material of the current collecting plates.

FIG. 8 shows an example the same as that of FIG. 7, except that in FIG. 8, the reinforcing plates 590 as shown in FIG. 7 are omitted, and the thickness of each of end plates 604 was 50 mm in place of 30 mm. The other elements shown in FIG. 8 with reference numerals of the six hundreds such as 601 are equivalent to the elements in FIG. 7 with the corresponding reference numerals of the five hundreds such as 701. That is, gas inlets (or outlets) 602 and 603 are each provided at an end surface of each of the end plates 604, when the gas inlets (or outlets) 602 and 603 are integrally formed with the end plate 604 as parts of the end plate 604 by e.g. injection-molding of the end plate material. The current collecting plate 606 is inserted in the end plate 604, and the inside surface of the hole, to be a manifold hole, of the current collecting plate 606 is fittedly joined and covered with a portion 604C of the end plate material extended to have a cylindrical shape, whereby the cylinder-shaped resin material portion 604C of the end plate material serves as a manifold hole 601 for the current collecting plate 606. The cylinder-shaped portion 604C of the end plate is provided with a groove for an O-ring, and the groove is provided with an O-ring 608 for performing as sealing between the end late 604 and the separator late 622 so as to prevent the supplied eases and cooling water from contacting the current collecting plate 606. An MEA 610 comprises a cathode 612 and an anode 613, and a polymer electrolyte membrane 611 sandwiched by the two electrodes. The MEA is sandwiched between separator plates 622 and 620. A tightening means 670 is made of a bolt, a nut and a washer. Lastly, FIG. 9 shows an example the same as that of FIG. 8, except that in FIG. 9, the gas inlets and outlets 702, 703 are not integrally formed as parts of end plates 704 by e.g. injection-molding of the end plate, but that instead a coupling such as Swagelok (product of Swagelok Company), as shown, is fittedly engaged with each of end openings or manifold holes of the end plates 704. Reference numerals 712, 713 and 770 indicate a cathode, an anode and a tightening means, respectively. Both the examples shown in FIGS. 8 and 9 were confirmed to have similar and operable characteristics as those of the other EXAMPLES.

As evident from the foregoing descriptions, according to the present invention, conventional insulating plates can be omitted by e.g. the use of resin-dominant end plates in place of conventional metal end plates, and more preferably by making the end plates with injection-molding. Because of the omission of the insulating plates and other elements, the cost of the fuel cell according to the present invention can be very much reduced. Furthermore, since the use of the resin-dominant material for the end plates allows the fuel cell to have such a structure that the supplied gases and cooling water do not contact metal materials, the corrosion resistance of the fuel cell can be very much improves.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A polymer electrolyte fuel cell comprising:
    a cell stack comprising a plurality of electrically conductive separator plates and electrolyte membrane-electrode assemblies sandwiched between neighboring separator plates, each of said electrolyte membrane-electrode assemblies comprising a pair of electrodes and a polymer electrolyte membrane sandwiched between said pair of electrodes;
    a a first and a second current collecting plate sandwiching said cell stack;
    a a first and a second end plate sandwiching said current collecting plates;
    a tightening means for tightening said end plates so as to apply a tightening pressure to said cell stack;
    gas supply and exhaustion means for supplying, to said cell stack, and exhausting, from said cell stack, an oxidant gas and a fuel gas, said gas supply and exhaustion means comprising:
        an oxidant gas inlet-side manifold, an oxidant gas outlet-side manifold, a fuel as inlet-side manifold and a fuel gas outlet-side manifold, and also comprising an oxidant gas flow channel for connecting said oxidant gas inlet-side manifold and said oxidant gas outlet-side manifold and a fuel gas flow channel for connecting said fuel gas inlet-side manifold and said fuel gas outlet-side manifold,
    wherein each end plate is made of an electrically insulating resin-dominant material comprising resin as a main ingredient; and
    wherein said first end plate comprises a first cylinder-shaped portion and a second cylinder-shaped portion and said second end plate comprises a first cylinder-shaped portion and a second cylinder-shaped portion; and
    wherein said first current collecting plate comprises a first hole and a second hole and said second current collecting plate comprises a first hole and a second hole; and
    wherein the first cylinder-shaped portion of the first end plate is inserted into the first hole of the first collecting plate to provide said oxidant gas inlet-side manifold: the second cylinder-shaped portion of the first end plate is inserted into the second hole of the first collecting plate to provide said fuel gas inlet-side manifold: the first cylinder-shaped portion of the second end plate is inserted into the first hole of the second collecting plate to provide said oxidant gas outlet-side manifold; and the second cylinder-shaped portion of the second end plate is inserted into the second hole of the second collecting plate to provide said fuel gas outlet-side manifold.

2. The polymer electrolyte fuel cell according to claim 1, wherein each of said end plates comprises an injection-molded body made of said resin-dominant material.

3. The polymer electrolyte fuel cell according to claim 1, wherein each of said current collecting plates and each of said end plates constitute an integrally molded body, wherein each of said current collecting plates is fittedly embedded in each of said end plates.

4. The polymer electrolyte fuel cell according to claim 1, wherein each of said gas inlets and said gas outlets has a shape of cylinder, and is structured to protrude from a main surface of each of said end plates.

5. The polymer electrolyte fuel cell according to claim 1, wherein each of said gas inlet-side manifold and said gas outlet-side manifold has a shape of cylinder, and is structured to protrude from an end surface of each of said end plates.

6. The polymer electrolyte fuel cell according to claim 1, wherein said resin-dominant material of said end plates contains a reinforcing material, and said resin of said resin-dominant material is selected from polyphenylene sulfide, liquid crystal polymer and polysulfone.

7. The polymer electrolyte fuel cell according to claim 1, wherein said tightening pressure by said tightening means is from 1.5 to 5.0 kgf/cm$^2$ per unit area.

8. The polymer electrolyte fuel cell according to claim 1, wherein each of said end plates further has a reinforcing member provided on an outer main surface thereof.

9. The polymer electrolyte fuel cell of claim 1 further comprising a cooling water supply and exhaustion means for supplying to said cell stack, and exhausting from said cell, cooling water, said cooling water supply and exhaustion means comprising a cooling water inlet-side manifold and a cooling water outlet-side manifold, and also comprising a cooling water flow channel for connecting said cooling water inlet-side manifold and said cooling water outlet-side manifold; wherein
    (1) said first end plate comprises a third cylinder-shaped portion and said second end plate comprises a third cylinder-shaped portion;
    (2) said first current collecting plate comprises a third hole and said second current collecting plate comprises a third hole;
    (3) the third cylinder-shaped portion of the first end plate is inserted into the third hole of the first current collecting plate to provide said cooling water inlet-side manifold; and (4) the third cylinder-shaped portion of the second end plate is inserted into the third hole of the second current collecting plate to provide said cooling water outlet-side manifold.

10. The polymer electrolyte fuel cell of claim 1 wherein at least one of the cylinder-shaped portions has a groove which receives an O-ring; and the O-ring serves as a gas seal between the current collecting plate and the separator plate; and wherein said cylinder-shaped portion and the separator plate are adjacent to said current collecting plate; and wherein said separator plate comprises a cylinder shaped portion.

* * * * *